United States Patent
Salehin et al.

(10) Patent No.: US 11,805,380 B2
(45) Date of Patent: Oct. 31, 2023

(54) AUGMENTED AUDIO FOR COMMUNICATIONS

(71) Applicant: QUALCOMM Incorporated, San Diego, CA (US)

(72) Inventors: S M Akramus Salehin, San Diego, CA (US); Lae-Hoon Kim, San Diego, CA (US); Xiaoxin Zhang, Sunnyvale, CA (US); Erik Visser, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/446,498

(22) Filed: Aug. 31, 2021

(65) Prior Publication Data

US 2023/0060774 A1 Mar. 2, 2023

(51) Int. Cl.
 *H04S 7/00* (2006.01)
 *G06F 3/01* (2006.01)
 *H04R 3/00* (2006.01)

(52) U.S. Cl.
 CPC .............. *H04S 7/303* (2013.01); *G06F 3/013* (2013.01); *H04S 7/305* (2013.01); *H04S 2400/11* (2013.01); *H04S 2400/15* (2013.01)

(58) Field of Classification Search
 None
 See application file for complete search history.

(56) References Cited

U.S. PATENT DOCUMENTS

| | | | |
|---|---|---|---|
| 7,346,654 B1 * | 3/2008 | Weiss | H04N 7/15 348/E7.083 |
| 10,251,011 B2 | 4/2019 | Ray et al. | |
| 10,932,081 B1 * | 2/2021 | Raghuvanshi | H04S 7/305 |
| 11,172,320 B1 * | 11/2021 | Pelzer | G06T 15/06 |
| 2014/0100839 A1 * | 4/2014 | Arendash | G06F 30/20 381/98 |
| 2014/0270187 A1 * | 9/2014 | Hall | H04S 5/00 381/17 |
| 2016/0080874 A1 * | 3/2016 | Fullam | G06F 3/165 381/313 |
| 2017/0039767 A1 * | 2/2017 | Lanier | G06F 3/011 |
| 2020/0053505 A1 * | 2/2020 | Peters | H04S 7/304 |

(Continued)

FOREIGN PATENT DOCUMENTS

| | | | | |
|---|---|---|---|---|
| EP | 3313101 A1 * | 4/2018 | | H04S 3/008 |
| KR | 20200071099 A | 6/2020 | | |

(Continued)

OTHER PUBLICATIONS

English translation of KR20200071099 provided by Espacenet. pp. 1-17 (Year: 2020).*

(Continued)

*Primary Examiner* — Qin Zhu
(74) *Attorney, Agent, or Firm* — QUALCOMM Incorporated; Espartaco Diaz Hidalgo

(57) ABSTRACT

A device includes one or more processors configured to determine, based on data descriptive of two or more audio environments, a geometry of a mutual audio environment. The one or more processors are also configured to process audio data, based on the geometry of the mutual audio environment, for output at an audio device disposed in a first audio environment of the two or more audio environments.

29 Claims, 14 Drawing Sheets

(56) References Cited

U.S. PATENT DOCUMENTS

| | | | |
|---|---|---|---|
| 2020/0245065 A1* | 7/2020 | Yorga | H04R 3/005 |
| 2021/0025976 A1 | 1/2021 | Chandel et al. | |
| 2021/0058730 A1* | 2/2021 | Raghuvanshi | H04S 7/303 |

FOREIGN PATENT DOCUMENTS

| | | | | |
|---|---|---|---|---|
| WO | 2020231884 A1 | 11/2020 | | |
| WO | WO-2021198152 A1 * | 10/2021 | | A63F 13/54 |

OTHER PUBLICATIONS

International Search Report and Written Opinion—PCT/US2022/075724—ISA/EPO—dated Dec. 13, 2022.

* cited by examiner

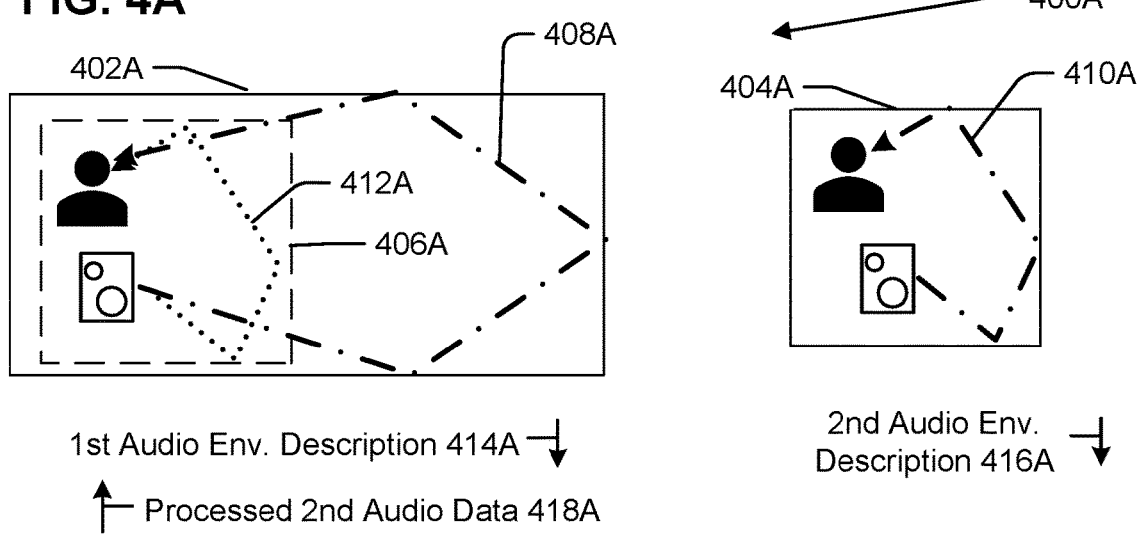
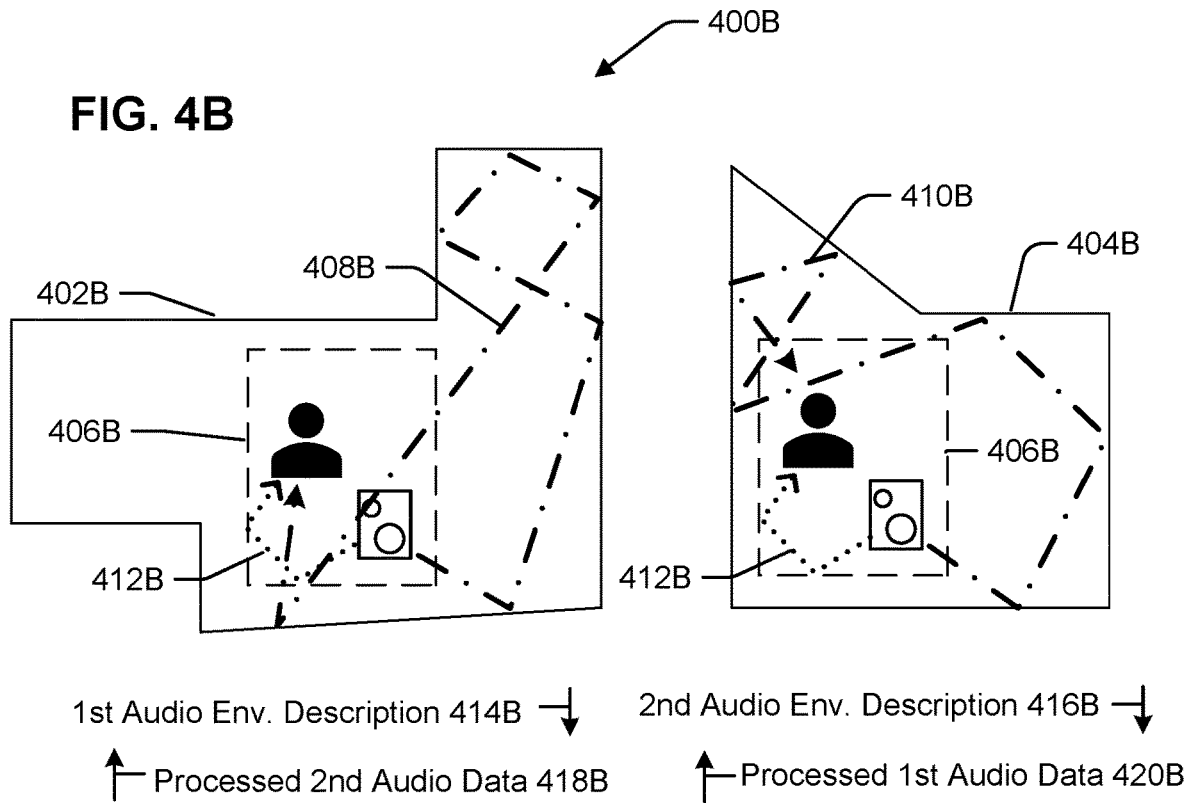

AUGMENTED AUDIO FOR COMMUNICATIONS

I. FIELD

The present disclosure is generally related to augmented audio for communications.

II. DESCRIPTION OF RELATED ART

As technology advances, more and more computing environments incorporate elements of extended reality ("XR"), such as virtual reality, augmented reality, mixed reality, etc. In XR environments, one or more virtual, or computer-generated, elements can be present in a user's computing environment. The user's computing environment can also include one or more elements from the user's actual reality.

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities, including, for example, multimedia systems that enable the user of the device to interact with an XR environment.

It can be challenging to make a user's experience of the XR environments realistic and seamlessly merged with the user's real-world physical environment. For example, differences in acoustical characteristics between two environments can cause sound output to the user to seem unnatural.

III. SUMMARY

In a particular aspect, a device includes a memory storing instructions and one or more processors coupled to the memory. The one or more processors are configured to execute the instructions to determine, based on data descriptive of two or more audio environments, a geometry of a mutual audio environment. The one or more processors are also configured to process audio data, based on the geometry of the mutual audio environment, for output at an audio device disposed in a first audio environment of the two or more audio environments.

In a particular aspect, a method includes determining, based on data descriptive of two or more audio environments, a geometry of a mutual audio environment. The method also includes processing audio data, based on the geometry of the mutual audio environment, for output at an audio device disposed in a first audio environment of the two or more audio environments.

In a particular aspect, a non-transitory computer-readable storage medium includes instructions that when executed by a processor, cause the processor to determine, based on data descriptive of two or more audio environments, a geometry of a mutual audio environment. The instructions, when executed by the processor, also cause the processor to process audio data, based on the geometry of the mutual audio environment, for output at an audio device disposed in a first audio environment of the two or more audio environments.

In a particular aspect, an apparatus for communication includes means for determining, based on data descriptive of two or more audio environments, a geometry of a mutual audio environment. The apparatus also includes means for processing audio data, based on the geometry of the mutual audio environment, for output at an audio device disposed in a first audio environment of the two or more audio environments.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

FIG. 4A illustrates a first exemplary audio environment configuration including a first audio environment, a second audio environment, and a virtual, mutual audio environment, in accordance with some examples of the present disclosure.

FIG. 4B illustrates a second exemplary audio environment configuration including a first audio environment, a second audio environment, and a virtual, mutual audio environment, in accordance with some examples of the present disclosure.

V. DETAILED DESCRIPTION

Systems to provide one or more virtual sound sources in an XR environment can generate sound in a manner that is unnatural for a user when compared to a user's experience of sound sources within the user's real-world environment. For example, current systems do not account for differing acoustical environments for different interacting users, nor do current systems account for the movement of a user within the XR environment with respect to the virtual sound sources.

The disclosed systems and methods determine, based on data descriptive of two or more audio environments for two or more users, a geometry of a mutual audio environment. The disclosed systems and methods can then process audio data from the two or more users, based on the geometry of the mutual audio environment, for output at an audio device disposed in each audio environment. For example, the disclosed systems and methods use various components of each user's networking environment (e.g., the user's router, computing device, etc.) to determine the geometry of each user's audio environment and/or the position and orientation of each user within his/her audio environment. The disclosed systems and methods can then generate a virtual, mutual audio environment for all users, based on the geometry of each user's audio environment, and then process each user's audio data based on the geometry of the virtual, mutual audio environment.

Figure 1:
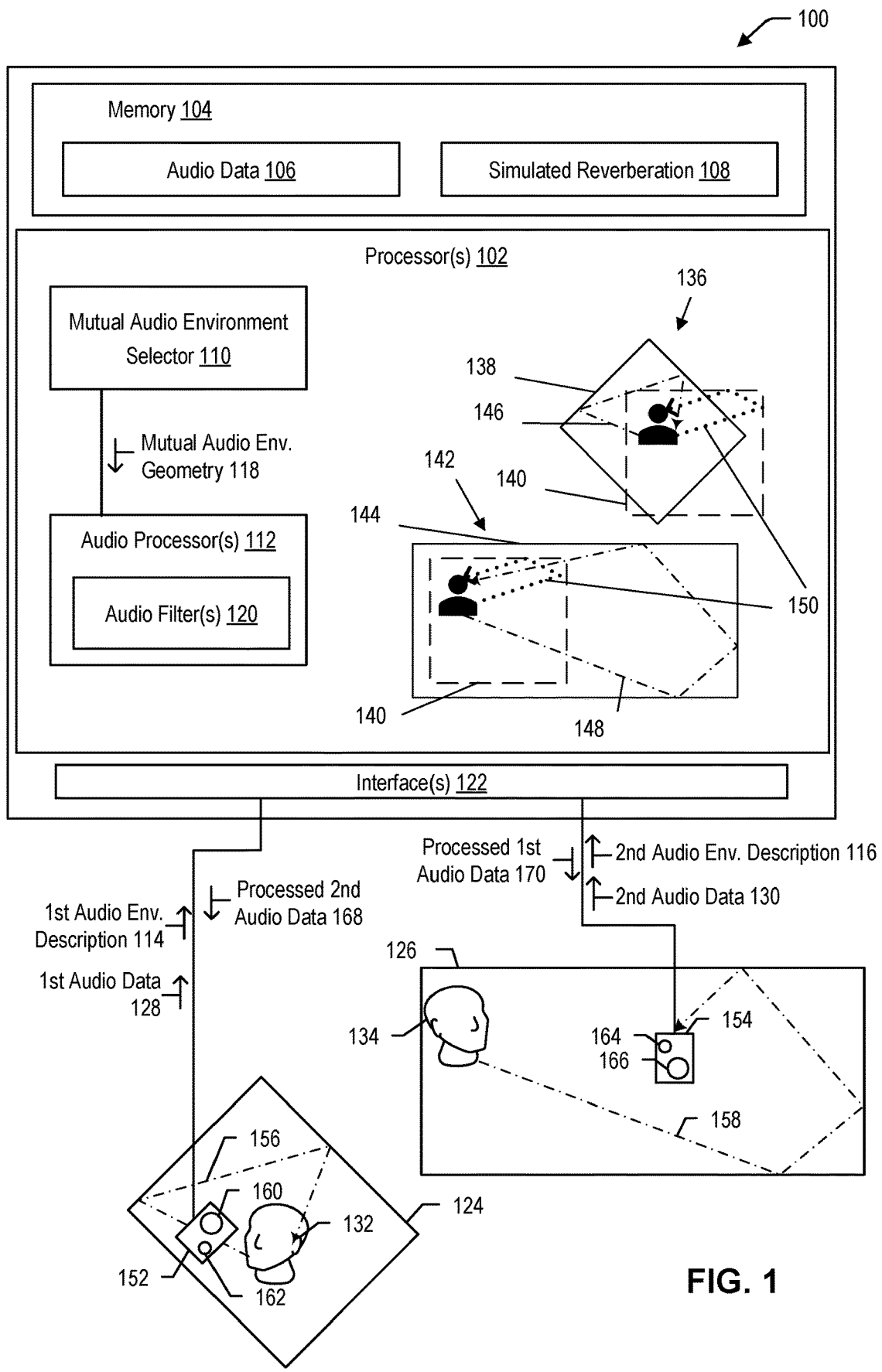
FIG. 1 is a block diagram of an example of a system that includes a device that is configured to augment audio for communications, in accordance with some examples of the present disclosure.

Particular aspects of the present disclosure are described below with reference to the drawings. In the description, common features are designated by common reference numbers. As used herein, various terminology is used for the purpose of describing particular implementations only and is not intended to be limiting of implementations. For example, the singular forms "a," "an," and "the" are intended to include the plural forms as well, unless the context clearly indicates otherwise. Further, some features described herein are singular in some implementations and plural in other implementations. To illustrate, FIG. 1 depicts a device 100 that includes one or more processors (e.g., processor(s) 102 in FIG. 1), which indicates that in some implementations the device 100 includes a single processor 102 and in other implementations the device 100 includes multiple processors 102. For ease of reference herein, such features are generally introduced as "one or more" features and are subsequently referred to in the singular or optional plural (generally indicated by terms ending in "(s)") unless aspects related to multiple of the features are being described.

The terms "comprise," "comprises," and "comprising" are used herein interchangeably with "include," "includes," or "including." Additionally, the term "wherein" is used interchangeably with "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc. As used herein, "directly coupled" refers to two devices that are coupled (e.g., communicatively coupled, electrically coupled, or physically coupled) without intervening components.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

FIG. 1 is a block diagram of an example of a system that includes a device 100 that is configured to augment audio for communications, in accordance with some examples of the present disclosure. The device 100 can be used to augment audio from a first audio environment 124 for output in a second audio environment 126, where the first and second audio environments 124 and 126 have different physical geometries. The device 100 can augment the audio from the first audio environment 124 such that the audio sounds to the user of the second audio environment 126 as though the first and second audio environments 124 and 126 have similar geometries.

In some implementations, the device 100 includes one or more processors 102 coupled to a memory 104. The processor(s) 102 are configured to receive a first audio environment description 114 descriptive of the first audio environment 124, to receive a second audio environment description 116 descriptive of the second audio environment 126, and to determine a mutual audio environment geometry 118 based on the first and second audio environment descriptions 114 and 116, as described further below. In some implementations, the processor(s) 102 are further configured to process, based on the mutual audio environment geometry 118, first audio data 128 from the first audio environment 124 and second audio data 130 from the second audio environment 126 to generate processed first audio data 170 and processed second audio data 168, as described further below.

In some implementations, the processor(s) 102 are further configured to output the processed first audio data 170 to the second audio environment 126 and/or output the processed second audio data 168 to the first audio environment 124. As described further below, the processed first audio data 170 can enable a user 134 in the second audio environment 126 to hear communication from the first audio environment 124 as though the first and second audio environments 124 and 126 have substantially similar acoustical properties even when the real-world acoustical properties (e.g., room dimensions, materials, etc.) of the first audio environment 124 and the second audio environment 126 are different. Similarly, the processed second audio data 168 can enable a user 132 in the first audio environment 124 to hear communication from the second audio environment 126 as though the first and second audio environments 124 and 126 have substantially similar acoustical properties.

In a particular aspect, the device 100 is disposed within the first audio environment 124 or the second audio environment 126. For example, the device 100 can include, correspond to, or be included within a user device 152 (such as a communication device or a computing device) used by a user 132 in the first audio environment 124. In another particular aspect, the device 100 is remote from the first audio environment 124 and the second audio environment 126. For example, the device 100 may include, correspond to, or be included within one or more server devices that interact with user devices 152 and 154 disposed in the first and second audio environments 124 and 126.

The first audio environment 124 has particular acoustical properties based on, for example, the physical dimensions of the first audio environment 124 (also referred to herein as the geometry of the first audio environment 124), the physical materials constituting the first audio environment 124, the acoustical materials of certain physical materials constituting the first audio environment 124, and/or other characteristics of the first audio environment 124. For example, the first audio environment can be an eight-foot-by-eight-foot conference room, with walls made of unpainted concrete with a sound absorption coefficient of 0.02.

In some implementations, the first audio environment 124 can include a user device 152. The user device 152 can include, correspond to, or be included within a communication device or a computing device such as a desktop computer, laptop computer, tablet, smart phone, etc. In some implementations, the user device 152 can include one or more output components 160, such as a speaker, for outputting an audio signal to the user 132 of the first audio environment 124. The user device 152 can also be configured to convert incoming audio data to an audio signal for output to the user 132. For example, as described further below, the user device 152 can convert the processed second audio data 168 from the device 100 into an audio signal for output to the user 132.

In the same or alternative implementations, the user device 152 can also include one or more input components 162, such as a microphone, for receiving an audio signal from the user 132 of the first audio environment 124. The user device 152 can also be configured to convert an audio signal from the user 132 into data descriptive of the audio signal for output to one or more other computing and/or communication devices. For example, as described further below, the user device 152 can convert an incoming voice audio signal from the user 132 into the first audio data 128 for communication to the device 100.

The first audio environment 124 can also include one or more sound sources. The sound source(s) can include any source of sound that can generate an audio signal for communication to another audio environment. In a particular aspect, the sound source(s) can include or correspond to the user 132 (e.g., by talking or otherwise making noise during a conference call), other people or animals in the first audio environment 124, ambient sound sources (e.g., wind rustling leaves, traffic, etc.), and/or other devices in the first audio environment. To illustrate, two or more users may be present in the first audio environment 124. As another illustrative example, the first audio environment 124 can include a plurality of instruments and/or vocalists performing in a concert. The user device 152 can be configured to communicate data descriptive of the sound source(s) to the device 100 for processing, as described in more detail below and with reference to FIGS. 3-6.

The audio signal from a sound source within the first audio environment 124, such as the user 132, can travel myriad paths from the user 132 to the user device 152, according to the geometry of the first audio environment 124. For example, as illustrated in FIG. 1, the audio signal from the user 132 can travel the first sound path 156 from the user 132 to the user device 152. The exemplary first sound path 156 reflects from the user 132 around a plurality of physical walls constituting the first audio environment 124 before arriving at the user device 152. Likewise, an output audio signal from the user device 152 can travel the exemplary first sound path 156, reflecting around a plurality of physical walls constituting the first audio environment 124, before arriving at the user 132. Depending on the path taken by sound in the first audio environment 124, the sound's acoustical properties can change. For example, the audio signal can have a certain amount of reverberation. The reverberation associated with an audio signal can include "early" reverberation and "late" reverberation. In a particular example, early reverberation can include audio reflections heard by a listener within a threshold time of the sound's origination (e.g., 3-4 milliseconds). Late reverberation can include audio reflections heard by a listener outside the threshold time for early reverberation, but within a longer threshold time of the sound's origination (e.g., from 4-20 milliseconds).

Given the relatively constant speed of sound, the length of time it takes an audio signal to traverse the first audio environment 124 can change depending on the physical dimensions of the first audio environment 124. As a result, the amount and type of reverberation associated with the audio signal can change. As the user 132 in the first audio environment 124 hears the reverberation associated with the audio signal, the user's experience of the audio signal can change based on the geometry of the first audio environment 124.

The second audio environment 126 has particular acoustical properties based on, for example, the physical dimensions of the second audio environment 126 (also referred to herein as the geometry of the second audio environment 126), the physical materials constituting the second audio environment 126, the acoustical materials of certain physical materials constituting the second audio environment 126, and/or other data characteristics of the second audio environment 126. For example, the second audio environment can be an eight-foot-by-twelve-foot conference room, with walls made of painted concrete with a sound absorption coefficient of 0.1.

The second audio environment 126 can also include a user device 154 in some implementations. The user device 154 can include, correspond to, or be included within a communication device or a computing device such as a desktop computer, laptop computer, tablet, smart phone, etc. In some implementations, the user device 154 can include one or more output components 166, such as a speaker, for outputting an audio signal to the user 134 of the second audio environment 126. The user device 154 can also be configured to convert incoming audio data to an audio signal for output to the user 134. For example, as described further below, the user device 154 can convert the processed first audio data 170 from the device 100 into an audio signal for output to the user 134.

In the same or alternative implementations, the user device 154 can also include one or more input components 164, such as a microphone, for receiving an audio signal from the user 134 of the second audio environment 126. The user device 154 can also be configured to convert an audio signal from the user 134 into data descriptive of the audio signal for output to one or more other computing and/or communication devices. For example, as described further below, the user device 154 can convert an incoming voice audio signal from the user 134 into the second audio data 130 for communication to the device 100.

The second audio environment 126 can also include one or more sound sources. The sound source(s) can include any source of sound that can generate an audio signal for communication to another audio environment. In a particular aspect, the sound source(s) can include or correspond to the user 134 (e.g., by talking or otherwise making noise during a conference call), other people or animals in the second audio environment 126, ambient sound sources (e.g., wind rustling leaves, traffic, etc.), and/or other devices in the second audio environment. To illustrate, two or more users may be present in the second audio environment 126. As another illustrative example, the second audio environment 126 can include a plurality of instruments and/or vocalists performing in a concert. The user device 154 can be configured to communicate data descriptive of the sound source (s) to the device 100 for processing, as described in more detail below and with reference to FIGS. 3-6.

The audio signal from a sound source within the second audio environment 126, such as the user 134, can travel myriad paths from the user 134 to the user device 154, according to the geometry of the second audio environment 126. For example, as illustrated in FIG. 1, the audio signal from the user 134 can travel the second sound path 158 from the user 134 to the user device 154. The exemplary second sound path 158 reflects from the user 134 around a plurality of physical walls constituting the second audio environment 126 before arriving at the user device 154. Likewise, an output audio signal from the user device 154 can travel the exemplary second sound path 158, reflecting around a plurality of physical walls constituting the second audio environment 126, before arriving at the user 134.

Given the relatively constant speed of sound, the length of time it takes an audio signal to traverse the second audio environment 126 can change depending on the physical dimensions of the second audio environment 126. As a result, the amount and type of reverberation associated with the audio signal can change. As the user 132 in the second audio environment 126 hears the reverberation associated with the audio signal, the user's experience of the audio signal can change based on the geometry of the second audio environment 126.

In some implementations, the user(s) 132 and 134 of the first and second audio environments 124 and 126 can also physically move around within his/her respective audio environment. For example, the user 132 can move around within the physical dimensions of the audio environment (e.g., pacing, moving to the front of the room, etc.). As an additional example, the user 132 can physically move part of his/her body within the audio environment (e.g., turning his/her head, facing a sound source, turning away from a sound source, etc.).

Physical movement within the audio environment can be a natural part of the user 132 interacting with the audio environment. The physical movement, however, can change a user's position and/or orientation with respect to one or more sound sources within the audio environment. Change to a user's position and/or orientation with respect to one or more sound sources within the audio environment can change the way the user experiences the sound source(s). For example, a user can expect that a sound source should grow louder when the user moves closer to the sound source and quieter when the user moves further away from the sound source. Keeping track of the user's movement within the audio environment can be used to provide more natural augmented audio in multi-user communication, as described further below.

In some implementations, user device 152 can communicate a first audio environment description 114 to the device 100. The first audio environment description 114 can include data descriptive of one or more sound sources within the first audio environment 124, the geometry of the first audio environment 124, the user orientation of a user 132 within the first audio environment 124, the user motion of the user 132 within the first audio environment 124, an indication of a location of a sound source within the first audio environment 124, and/or a location within the first audio environment 124 of a virtual reality object, an augmented reality object, a mixed reality object, and/or an extended reality object. In the same or alternative implementations, the first audio environment description 114 can include data descriptive of reverberation characteristics of the first audio environment 124, locations of particular features within the first audio environment 124 (such as a location of a display screen), etc. In other examples, the first audio environment description 114 includes less information that illustrated in FIG. 1. For example, when the first audio environment 124 includes a stationary workstation, data descriptive of user motion within the first audio environment 124 may be omitted.

In some implementations, user device 152 can communicate a second audio environment description 116 to the device 100. The second audio environment description 116 can include data descriptive of one or more sound sources within the second audio environment 126, the geometry of the second audio environment 126, the user orientation of a user 132 within the second audio environment 126, the user motion of the user 132 within the second audio environment 126, an indication of a location of a sound source within the second audio environment 126, and/or a location within the second audio environment 126 of a virtual reality object, an augmented reality object, a mixed reality object, and/or an extended reality object. In the same or alternative implementations, the second audio environment description 116 can include data descriptive of reverberation characteristics of the second audio environment 126, locations of particular features within the second audio environment 126 (such as a location of a display screen), etc. In other examples, the second audio environment description 116 includes less information that illustrated in FIG. 1. For example, when the second audio environment 126 includes a stationary workstation, data descriptive of user motion within the second audio environment 126 may be omitted.

In some implementations, first and second audio environment descriptions 114 and 116 describe respective audio environments that can have different acoustical properties. For example, the first and second audio environments 124 and 126 can have different physical dimensions, different acoustical properties, etc. As noted above, therefore, the users 132 and 134 of the first and second audio environments 124 and 126 can have different experiences and/or expectations associated with audio signals within his/her respective audio environment.

In some implementations, the processor(s) 102 can be configured to select a virtual, mutual audio environment for all users in a particular communication. For example, the mutual audio environment selector 110 can use the first audio environment description 114 and the second audio environment description 116 to select a virtual, mutual audio environment with a mutual audio environment geometry 118 that does not correspond to the first audio environment 124 and/or the second audio environment 126. The processor(s) 102 can be further configured to process audio from the sound source(s) within the first and second audio environments 124 and 126 such that the users 132 and 134 hear the audio as though the audio originated within the virtual, mutual audio environment rather than from the differing, physical first and/or second audio environments 124, 126.

As an illustrative example, FIG. 1 illustrates a selection of a virtual, mutual audio environment. FIG. 1 illustrates a first exemplary XR environment 136 and a second exemplary XR environment 142. The first XR environment 136 and the second XR environment 142 are provided to aid in understanding and are not intended to limit the scope of the present disclosure. Other exemplary configurations of determining a mutual audio environment geometry 118 based on the first audio environment description 114 and the second audio environment description 116 are described in more detail below with reference to FIGS. 4A-4D. In FIG. 1, the first exemplary XR environment 136 generally corresponds to the first audio environment 124, based on the first audio environment description 114. The second exemplary XR environment 142 generally corresponds to the second audio environment 126, based on the second audio environment description 116.

The first exemplary XR environment 136 illustrates the geometry 138 of the first audio environment 124, while the second exemplary XR environment 142 illustrates the geometry 144 of the second audio environment 126. Sound paths 146 and 148 illustrate the different paths sound generated by a sound source can take within the first audio environment 124 and the second audio environment 126, respectively. As noted above, the differing sound paths can result in audio signals with different acoustical properties such as reverberation. The reverberation associated with an audio signal originating in the first audio environment 124 can, for example, sound unnatural to a user in the second audio environment 126, and vice versa.

Based on the first and second audio environment descriptions 114, 116, the processor(s) 102 can select a mutual audio environment geometry 118 for use within both the first and second audio environments 124 and 126. FIG. 1 illustrates an exemplary mutual audio environment 140 within the first and second exemplary XR environments 136 and 142. As described further below, the processor(s) 102 can alter the audio data from the first and second audio environments 124 and 126 to sound as though the audio signals originated within the exemplary mutual audio environment 140. To a user within either the first exemplary XR environment 136 or the second exemplary XR environment 142, the audio signal can sound as though it follows a third sound path 150, which can sound more natural to the user.

The first XR environment 136 and the second XR environment 142 are provided to aid in understanding and are not intended to limit the scope of the present disclosure. Other exemplary configurations of determining a mutual audio environment geometry 118 based on the first audio environment description 114 and the second audio environment description 116 are described in more detail below with reference to 4.

In some implementations, the processor(s) 102 can receive and store (e.g., as audio data 106) the first and/or second audio data 128 and 130 from the first and/or second audio environments 124 and 126. The processor(s) 102 can be further configured to process the audio data 106 to match the mutual audio environment geometry 118 by altering the acoustical properties of the received audio data. For example, the processor(s) 102 can remove reverberation associated with the original audio signal. The processor(s) can then model reverberation associated with the geometry of the exemplary mutual audio environment 140 to generate and store simulated reverberation 108.

As described in more detail below with reference to FIGS. 6 and 18, in addition to identifying reverberation associated with the audio data in its original audio environment, the processor(s) 102 can be configured to simulate reverberation associated with the audio data in the virtual, mutual audio environment. This can include, for example, modeling early reflections via a fast fourier transform convolution of the audio data with a simulated impulse response for the mutual audio environment. Modeling late reflections can include applying one or more comb and/or all-pass infinite impulse response filters to the audio data.

In some implementations, reverberation data can include directionality information as well as frequency response. Directionality information can indicate the direction from which a reverberation reflection is originating with respect to various aspects of the mutual audio environment geometry 118. For example, directionality information can indicate whether a reverberation reflection is incident to a user from one or more "walls" of a virtual, mutual audio environment. Frequency response can indicate which, if any, frequencies of an audio signal are reflecting at a certain point in time. As described in more detail below with reference to FIGS. 6 and 18, processing audio data can include simulating reverberation within the mutual audio environment geometry 118. Data associated with the simulated reverberation 108 can be stored at the memory 104.

In some implementations, processing the audio data 106 can include adding, removing, and/or modifying directionality information associated with a sound source to the audio data 106. In a particular configuration the directionality information can be stored separately from, or as part of, the simulated reverberation 108. In the same or alternative implementations, processing the audio data 106 can include changing a frequency range associated with one or more audio components of the audio data. For example, the processor(s) 102 can be configured to change one or more frequencies of the audio signal that reflect at a certain point in time. In a particular configuration, the frequency range modification(s) can be stored separately from, or as part of, the simulated reverberation 108.

In some implementations, processing the audio data 106 can also, or alternatively, include applying one or more audio filters 120 to add, remove, modify, and/or enhance one or more audio components of the audio data 106. As described in more detail below with reference to FIGS. 6 and 18, the audio processor(s) 112 can, for example, apply one or more least mean squares filters to remove reverberation from the data representative of an original audio signal. The processor(s) 102 can also, for example, apply one or more comb and/or all-pass infinite impulse response filters to simulate late reverberation within the mutual audio environment, as described in more detail below with reference to FIGS. 6 and 18. As an additional example, the processor(s) 102 can apply one or more filters to reduce and/or suppress background noise associated with one or more audio environments, enhance the sound quality of one or more sound sources, change the frequency of one or more sound sources, etc. As a further example, the processor(s) 102 can add and/or enhance background noise to an audio signal to simulate a different audio environment.

In some implementations, the processor(s) 102 can then communicate the processed audio data to the first and/or second audio environments 124 and 126, as appropriate. In some implementations, the device 100 can communicate the processed audio data such that the processed audio data is convolved with the simulated reverberation 108. In the same or alternative implementations, the device 100 can communicate the processed audio data and/or the simulated reverberation 108 separately.

In some implementations, the device 100 can be further configured to communicate the processed first and second audio data 168 and 170 back to the originating audio environment for output to a user. For example, the device 100 can be configured to communicate the processed first audio data 170 to the first audio environment 124 and the processed second audio data 168 to the second audio environment 124. The user device 152 can be further configured to output the processed first audio data 170 to the user 132 of the first audio environment 124, and the user device 154 can be further configured to output the processed second audio data 168 to the user 134 of the second audio environment 126. In such implementations, the users 132 and/or 134 may hear the processed audio data through an output component 160 and/or 166 such as, for example, headphones. The user could then hear their own voice, for example, as well as audio output from another environment as though both audio sources originated in the same audio environment.

In some implementations, communications to one or more of the particular audio environments, such as the first audio environment 124 and/or the second audio environment 126, can occur via one or more interfaces 122. The interface(s) 122 can be, for example, a wireless 802.11 interface and/or a wired Ethernet interface for communication with a particular audio environment.

Although FIG. 1 illustrates certain implementations, other implementations are possible without departing from the scope of the present disclosure. For example, FIG. 1 illustrates the exemplary mutual audio environment 140 as having a different geometry from the first exemplary XR environment 136 and a different orientation from the second exemplary XR environment 142. In other implementations, the mutual audio environment 140 can have the same geometry and/or orientation as one or more of the individual audio environments. In the same or alternative implementations, the mutual audio environment 140 can have different acoustical properties (e.g., sound dampening) from one or more of the individual audio environments while having substantially the same dimensions as one or more of the individual audio environments. Other exemplary mutual audio environments are described in more detail below with reference to FIGS. 4A-4D. In the same or alternative implementations, the device 100 can select the mutual audio environment geometry 118 for more than two individual audio environments.

Figure 2:
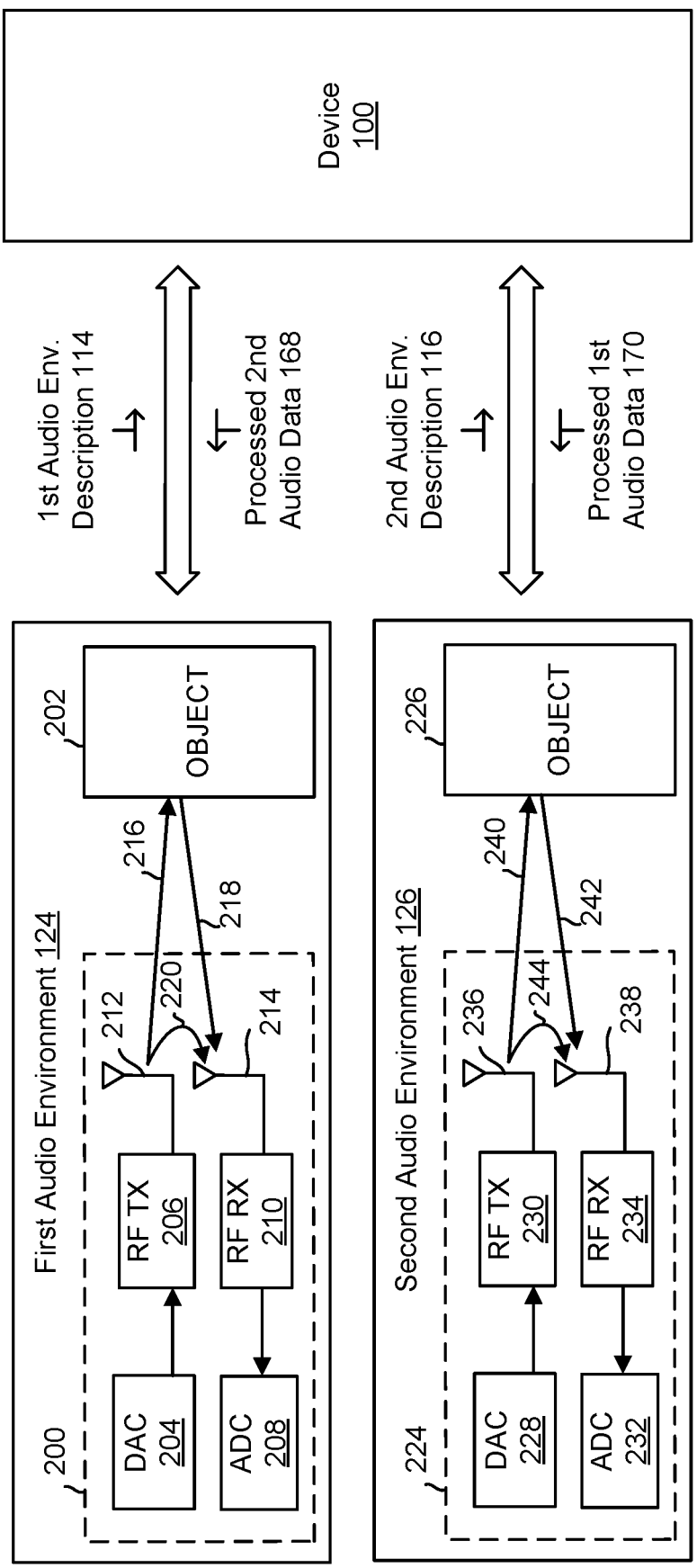
FIG. 2 is a block diagram of an example of a plurality of wireless devices that use RF sensing techniques to detect objects within a plurality of audio environments to generate a mapping of the audio environments, in accordance with some examples of the present disclosure.

According to a particular aspect, the device 100 can receive an automated mapping of an individual audio environment using radio frequency ("RF") sensing techniques to detect object(s) within the individual audio environment. FIG. 2 is a block diagram of an example of a plurality of wireless devices 200 and 224 that use RF sensing techniques to detect objects 202 and 226 within a plurality of audio environments 124, 126 to generate a wireless range measurement of the audio environments 124, 126. In some implementations, the wireless devices 200 and 224 can be mobile phone(s), wireless access point(s), and/or other device(s) that include at least one RF interface.

In some implementations, the wireless devices 200, 224 can include one or more components for transmitting an RF signal. Additionally, the wireless devices 200, 224 can include one or more digital-to-analog converters ("DAC") 204, 228 for receiving a digital signal or waveform and converting it to an analog waveform. The analog signals output from the DACs 204, 228 can be provided to one or more RF transmitters ("RF TX") 206, 230. Each of the RF transmitters 206, 230 can be a Wi-Fi transmitter, a 5G/New Radio ("NR") transmitter, a Bluetooth™ transmitter, or any other transmitter capable of transmitting an RF signal (Bluetooth is a registered trademark of Bluetooth SIG, Inc. of Kirkland, Wash., USA).

The RF transmitters 206, 230 can be coupled to one or more transmitting antennas 212, 236. In some implementations, each of the transmitting antennas 212, 236 can be an omnidirectional antenna capable of transmitting an RF signal in all directions. For example, the transmitting antenna 212 can be an omnidirectional Wi-Fi antenna that can radiate Wi-Fi signals (e.g., 2.4 GHz, 5 GHz, 6 GHz, etc.) in a 360-degree radiation pattern. In another example, the transmitting antenna 236 can be a directional antenna that transmits an RF signal in a particular direction.

In some examples, the wireless devices 200, 224 can also include one or more components for receiving an RF signal. For example, the wireless device 200 can include one or more receiving antennas 214, and the wireless device 224 can include one or more receiving antennas 238. In some examples, the receiving antenna 214 can be an omnidirectional antenna capable of receiving RF signals from multiple directions. In other examples, the receiving antenna 238 can be a directional antenna that is configured to receive signals from a particular direction. In further examples, both the transmitting antenna 212 and the receiving antenna 214 can include multiple antennas (e.g., elements) configured as an antenna array (e.g., linear antenna array, 2-dimensional antenna array, 3-dimensional antenna array, or any combination thereof).

The wireless devices 200, 224 can also include one or more RF receivers ("RF RX") 210, 234 coupled to the receiving antennas 214, 238, respectively. The RF receivers 210, 234 can include one or more hardware and/or software components for receiving a waveform such as a Wi-Fi signal, a Bluetooth™ signal, a 5G/NR signal, or any other RF signal. In some implementations, the RF receivers 210, 234 can be coupled to analog-to-digital converters ("ADCs") 208, 232, respectively. The ADCs 208, 232 can be configured to convert the received analog waveform into a digital waveform that can be provided to a processor.

In one example, the wireless devices 200, 224 can implement RF sensing techniques by causing transmission waveforms 216, 240 to be transmitted from the transmitting antennas 212, 236. Although the transmission waveforms 216 are illustrated as single lines, in some implementations, one or more of the transmission waveforms 216, 240 can be transmitted in all directions by an omnidirectional transmitting antenna. For example, the transmission waveform 216 can be a Wi-Fi waveform that is transmitted by a Wi-Fi transmitter in the wireless device 200. As an additional example, the transmission waveform 216 can be implemented to have a sequence that has certain autocorrelation properties. For instance, the transmission waveform 216 can include single-carrier Zadoff sequences and/or can include symbols similar to orthogonal frequency-division multiplexing (OFDM) and/or Long Training Field (LTF) symbols.

In some techniques, the wireless devices 200, 224 can further implement RF sensing techniques by performing transmit and receive functions concurrently. For example, the wireless device 200 can enable its RF receiver 210 to receive the waveform 218 at or near the same time as it enables the RF transmitter 206 to transmit the transmission waveform 216. The waveform 218 is a reflected portion of the transmission waveform 216 that has reflected from the object 202.

In some examples, transmission of a sequence or pattern that is included in the transmission waveform 216 can be repeated continuously such that the sequence is transmitted a certain number of times and/or for a certain duration of time. For example, if the wireless device 200 enables the RF receiver 210 after enabling the RF transmitter 206, repeating a transmission pattern in the transmission waveform 216 can be used to avoid missing the reception of any reflected signals.

By implementing simultaneous transmit and receive functionality, the wireless devices 200, 224 can receive any signals that correspond to the transmission waveforms 216, 240. For example, the wireless devices 200, 224 can receive signals that are reflected from reflectors (e.g., objects or walls) within a particular detection range of the wireless devices 200, 224, such as the waveforms 218, 242 reflected from objects 202 and 226, respectively. The wireless devices 200, 224 can also receive leakage signals (e.g., transmission leakage signals 220 and 244, respectively) that are coupled directly from the transmitting antennas 212, 236 to the receiving antennas 214, 238 without reflecting from any objects. In some implementations, one or more of the waveforms 218, 242 can include multiple sequences that correspond to multiple copies of a sequence that are included in the transmission waveforms 216, 240. In a particular implementation, the wireless devices 200, 224 can combine the multiple sequences that are received by the RF receivers 210, 234 to improve the signal to noise ratio.

The wireless devices 200, 224 can further implement RF sensing techniques by obtaining RF sensing data that is associated with each of the received signals corresponding to the transmission waveforms 216, 240. In some examples, the RF sensing data can include channel state information ("CSI") based on data relating to the direct paths (e.g., the leakage signals 220, 244) of the transmission waveforms 216, 240, together with data relating to the reflected paths (e.g., the waveforms 218, 242) that correspond to the transmission waveforms 216, 240.

In some techniques, RF sensing data (e.g., CSI data) can include information that can be used to determine how one or more of the transmission waveforms 216, 240 propagates from one or more of the RF transmitters 206, 230 to one or more of the RF receivers 210, 234. RF sensing data can include data that corresponds to the effects on the transmitted RF signals due to multi-path propagation, scattering, fading, and power decay with distance, or any combination thereof. In some examples, RF sensing data can include imaginary data and real data (e.g., I/Q components) corresponding to each tone in the frequency domain over a particular bandwidth.

In some examples, RF sensing data can be used to calculate distances and angles of arrival that correspond to reflected waveforms, such as the waveforms 218, 242. In further examples, RF sensing data can also be used to detect motion, determine location, detect changes in location or motion patterns, obtain channel estimation, or any combination thereof. In some cases, the distance and angle of arrival of the reflected signals can be used to identify the size and position of reflectors in the surrounding environment (e.g., objects 202, 226) to generate an indoor map. In some implementations, RF sensing data can also be used to identify transient objects that can be omitted from an indoor map (e.g., humans or pets walking through an indoor environment).

One or more of the wireless devices 200, 224 can also be configured to calculate distances and angles of arrival corresponding to reflected waveforms (e.g., the distance and angle of arrival corresponding to one or more of the waveforms 218, 242) by utilizing signal processing, machine learning algorithms, using any other suitable technique, or any combination thereof. In other examples, one or more of the wireless devices 200, 224 can send the RF sensing data to another computing device, such as a server, that can perform the calculations to obtain the distance and angle of arrival corresponding to one or more of the waveforms 218, 242 and/or other reflected waveforms.

In a particular example, the distance traveled by one or more of the waveforms 218, 242 can be calculated by measuring the difference in time from reception of the leakage signal 220, 244 to the reception of the reflected signals. For example, the wireless device 200 can determine a baseline distance of zero that is based on the difference from the time the wireless device 200 transmits the transmission waveform 216 to the time it receives the leakage signal 220 (e.g., propagation delay). The wireless device 200 can then determine a distance associated with the waveform 218 based on the difference from the time the wireless device 200 transmits the transmission waveform 216 to the time it receives the waveform 218, which can then be adjusted according to the propagation delay associated with the leakage signal 220. In doing so, the wireless device 200 can determine the distance traveled by the waveform 218, which can be used to determine the distance of a reflector (e.g., the object 202) that caused the reflection.

In additional examples, the angle of arrival of the waveform 218 can be calculated by measuring the time difference of arrival of the waveform 218 between individual elements of a receive antenna array, such as the receiving antenna 214. In some examples, the time difference of arrival can be calculated by measuring the difference in received phase at each element in the receive antenna array.

In further examples, the distance and the angle of arrival of the waveform 218 can be used to determine the distance between the wireless device 200 and the object 202 as well as the position of the object 202 relative to the wireless device 200. The distance and the angle of arrival of the waveform 218 can also be used to determine the size and shape of the object 202 that causes the reflection. For example, the wireless device 200 can utilize the calculated distance and angle of arrival corresponding to the waveform 218 to determine the point at which the transmission waveform 216 reflected from the object 202. The wireless device 200 can aggregate the reflection points for various reflected signals to determine the size and shape of the object 202.

In the same or alternative implementations, the wireless device 224 can be configured to implement functionality similar to that described above with reference to the wireless device 200. For example, the wireless device 224 can also determine the distance traveled by the waveform 242, which can be used to determine the distance of a reflector (e.g., the object 226) that caused the reflection. The waveform 242 is a reflected portion of the transmission waveform 240 that has reflected from the object 226. The wireless device 224 can also be configured to calculate the angle of arrival of the waveform 242 by measuring the time difference of arrival of the waveform 242 between individual elements of a receive antenna array, such as the receiving antenna 238. The wireless device 224 can also be configured to use the distance and the angle of arrival of the waveform 242 to determine the distance between the wireless device 224 and the object 226 as well as the position of the object 226 relative to the wireless device 224.

As noted above, the wireless devices 200, 224 can include mobile devices such as smartphones, laptops, tablets, etc. In some implementations, one or more of the wireless devices 200, 224 can be configured to obtain device location data and device orientation data together with the RF sensing data. In a particular implementation, device location data and device orientation data can be used to determine or adjust the distance and angle of arrival of a reflected signal (e.g., waveforms 218, 242). For example, a user may be holding the wireless device 200 and walking through a room during the RF sensing process. In this instance, the wireless device 200 can have a first location and a first orientation when it transmits the transmission waveform 216 and can have a second location and a second orientation when it receives the waveform 218. The wireless device 200 can account for the change in location and the change in orientation when it processes the RF sensing data to calculate the distance and angle of arrival. For example, the location data, the orientation data, and the RF sensing data can be correlated based on a time stamp associated with each element of data. In some techniques, the combination of the location data, the orientation data, and the RF sensing data can be used to determine the size and location of the object 202.

In some implementations, device position data can be gathered by one or more of the wireless devices 200, 224 using techniques that include round trip time ("RTT") measurements, passive positioning, angle of arrival, received signal strength indicator ("RSSI"), CSI data, using any other suitable technique, or any combination thereof. In further examples, device orientation data can be obtained from electronic sensors on the wireless devices 200, 224, such as a gyroscope, an accelerometer, a compass, a magnetometer, any other suitable sensor, or any combination thereof. For instance, a gyroscope on the wireless device 200 can be used to detect or measure changes in orientation of the wireless device 200 (e.g., relative orientation) and a compass can be used to detect or measure absolute orientation of the wireless device 200. In some implementations, the position and/or orientation of the wireless device 200 can be used by the device 100 of FIG. 1 as a proxy for the position and/or orientation of the user 132 of the first audio environment 124. Similarly, the position and/or orientation of the wireless device 224 can be used by the device 100 of FIG. 1 as a proxy for the position and/or orientation of the user 134 of the second audio environment 126.

Although FIG. 2 illustrates two wireless devices 200, 224 with substantially similar configurations, more than two devices can be used without departing from the scope of the present disclosure. Further, each of the two or more devices can be configured to perform some or all of the indoor mapping functionality using different components and/or particular implementations. For example, the wireless device 200 can use an omnidirectional transmitting antenna 212, while the wireless device 224 can use a directional transmitting antenna 236, without departing from the scope of the present disclosure. As an additional example, the wireless device 224 can be configured to track movement data (e.g., through an internal gyroscope), while the wireless device 200 can be configured to not track movement data.

In some implementations, the wireless device 200, 224 can be configured to communicate mapping data associated with each of the first and second audio environments 124, 126 to the device 100. For example, the wireless device 200 can be configured to communicate the distance between the wireless device 200 and the object 202 within the first audio environment 124. In some implementations, the mapping data can be communicated to the device 100 as some or all of the first audio environment description 114. Likewise, the wireless device 224 can be configured to communicate the distance between the wireless device 224 and the object 226 within the second audio environment 126. In some implementations, the mapping data can be communicated to the device 100 as some or all of the second audio environment description 116.

As described in more detail above with reference to FIG. 1, the device 100 can be configured to determine, based on the mapping data, a geometry of a mutual audio environment. The device 100 can, in some implementations, also be configured to process audio data, based on the geometry of the mutual audio environment, for output at one or more audio devices disposed in the first and second audio environments 124, 126. In some implementations, the device 100 can be configured to communicate the processed second audio data 168 to the first audio environment 124 and the processed first audio data 170 to the second audio environment 126, as described in more detail above.

In addition to identifying the location of one or more objects 202, 226 within the first and second audio environments 124, 126, the first and second audio environment descriptions 114, 116 can include a more thorough mapping of the respective audio environments. For example, in addition to identifying the location of a signal-reflecting object, an audio environment description can include a mapping of the walls constituting the audio environment.

Figure 3:
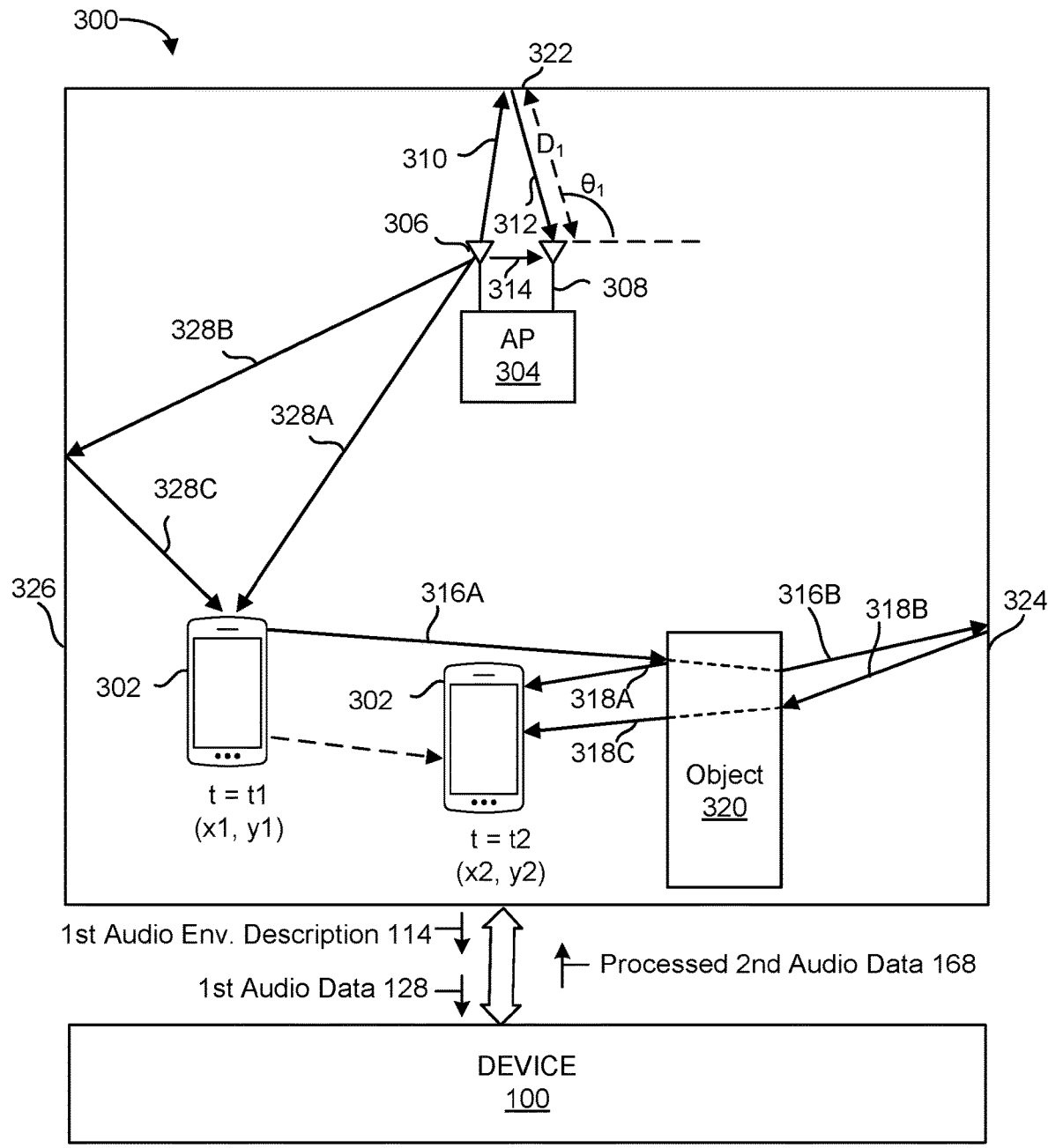
FIG. 3 is a diagram illustrating an indoor environment that can include one or more wireless devices configured to perform RF sensing to create an indoor map for use in augmenting communication, in accordance with some examples of the present disclosure.

FIG. 3 is a diagram illustrating an indoor environment 300 that can include one or more wireless devices configured to perform RF sensing to create an indoor map for use in augmenting communication, in accordance with some examples of the present disclosure. In some examples, the indoor environment 300 can include one or more wireless devices 302 (e.g., a mobile device) and/or one or more stationary wireless devices (e.g., access point ("AP") 304) that can be configured to perform RF sensing to create an indoor map of indoor environment 300.

Generally, the indoor environment 300 corresponds to the first audio environment 124 of FIG. 1. Although FIG. 3 illustrates a single indoor environment 300, more indoor environments can be included without departing from the scope of the present disclosure. For example, the device 100 can receive a first audio environment description 114 from the indoor environment 300 and a second audio environment description 116 from another indoor environment. Further, although FIG. 3 illustrates a single wireless device 302 and a single AP 304, more, fewer, and/or different components may be present within the indoor environment 300 without departing from the scope of the present disclosure. For example, the indoor environment 300 can include one or more APs 304, one or more wireless devices 302, zero APs 304 (and one or more wireless devices 302), and/or zero wireless devices 302 (and one or more APs 304).

FIG. 3 illustrates an exemplary mapping of the indoor environment 300 using a single AP 304 and a single wireless device 302. In a particular implementation, the AP 304 can be a Wi-Fi access point having a static or fixed location within the indoor environment 300. Although the indoor environment 300 is illustrated as having an access point (e.g., AP 304), any type of stationary wireless device (e.g., desktop computer, wireless printer, camera, smart television, smart appliance, etc.) can be configured to perform the techniques described herein. In one example, the AP 304 can include hardware and/or software components that can be configured to simultaneously transmit and receive RF signals, such as the components described herein with respect to the wireless device 200 of FIG. 2. For example, the AP 304 can include one or more antennas that can be configured to transmit an RF signal (e.g., the transmitting antenna 306) and one or more antennas that can be configured to receive an RF signal (e.g., the receiving antenna 308). As noted with respect to the wireless device 200, the AP 304 can include omnidirectional antennas and/or antenna arrays that are configured to transmit and receive signals from any direction.

In one aspect, the AP 304 can transmit an RF signal 310 that can reflect off various reflectors (e.g., static or dynamic objects located within a scene; structural element(s) such as walls, ceilings, or other barriers; and/or other objects) located in the indoor environment 300. For example, the RF signal 310 can reflect from a wall 322 and cause a reflected signal 312 to be received by the AP 304 via the receiving antenna 308. Upon transmitting the RF signal 310, the AP 304 can also receive a leakage signal 314 corresponding to a direct path from the transmitting antenna 306 to the receiving antenna 308.

In some implementations, the AP 304 can obtain RF sensing data associated with the reflected signal 312. For example, RF sensing data can include CSI data corresponding to the reflected signal 312. In a particular implementation, the AP 304 can use the RF sensing data to calculate a distance $D_1$ and an angle of arrival $\theta_1$ corresponding to the reflected signal 312. For example, the AP 304 can determine the distance $D_1$ by calculating a time of flight for the reflected signal 312 based on the difference or phase shift between the leakage signal 314 and the reflected signal 312. In the same or alternative implementations, the AP 304 can determine the angle of arrival $\theta_1$ by utilizing an antenna array to receive the reflected signals and measuring the difference in received phase at elements of the antenna array.

In some implementations, the AP 304 can utilize the distance $D_1$ and an angle of arrival $\theta_1$ corresponding to one or more reflected signals (e.g., the reflected signal 312) to identify the wall 322. In some implementations, the AP 304 can generate a map of the indoor environment 300 that includes data representative of the wall 322 (e.g., as some or all of the first audio environment description 114). In the same or alternative implementations, the AP 304 can communicate to the device 100 data for modifying a map of the indoor environment 300. Further, in the same or alternative implementations, the AP 304 can gather RF sensing data and provide the RF sensing data to another computing device (e.g., a server) for processing the calculations of time of flight and angle of arrival for the reflected signals.

In some implementations, the indoor environment 300 can also include the wireless device(s) 302. Although illustrated as a smart phone, the wireless device 302 can include, correspond to, or be included within any type of mobile device such as a tablet, laptop, smartwatch, etc. In a particular implementation, the wireless device 302 can be configured to perform RF sensing to create or modify an indoor map pertaining to the indoor environment 300.

In a particular implementation, the wireless device 302 can cause a waveform 316A to be transmitted via one or more of its RF transmitters. FIG. 3 illustrates the mobile device transmitting the waveform 316A at a first time (denoted "t1") and a first location (denoted "(x1, y1)"). In a particular implementation, the wireless device 302 can move while it is RF sensing such that the wireless device 302 is in a second location (denoted "(x2, y2)") at a second, later time (denoted "t2"). In a particular example, the waveform 316A can reflect from an object 320, and the wireless device 302 can receive the resultant reflected waveform 318A at time t2. In another particular example, the wavelength of the waveform 316A can be such that the waveform 316A penetrates and/or traverses the object 320, resulting in the waveform 316B, which reflects from a wall 324. The reflection 318B from the wall 324 can likewise traverse the object 320 and result in a reflected waveform 318C being received by the wireless device 302 at a third, later time t3.

In some implementations, the wireless device 302 can gather RF sensing data corresponding to the reflected waveforms 318A and 318C. In further aspects, the wireless device 302 can also capture device location data and device orientation data that corresponds to the time (e.g., t1) at which the waveform 316A was transmitted and/or to the times at which the reflected waveforms 318A (e.g., t2) and 318C (e.g., t3) were received.

In some implementations, the wireless device 302 can utilize the RF sensing data to calculate time of flight and angle of arrival for each of the reflected waveform 318A and 318C. In further examples, the wireless device 302 can utilize the location data and orientation data to account for the device's movement during the RF sensing process. In a particular implementation, the wireless device 302 can utilize the time of flight and angle of arrival for one or more of the reflected waveforms 318A, 318C to estimate a position of the wireless device at the time the reflected waveform(s) is received by the wireless device 302 (e.g., x2, x3, etc.). The wireless device 302 can be configured to estimate movement of the wireless device 302 based on, for example, a difference between an estimate of the position of the wireless device at a first time (e.g., x2) and an estimate of the position of the wireless device 302 at a second time (e.g., x3).

In the same or alternative implementations, the time of flight of the reflected waveforms 318A and 318C can be adjusted based on the device's movement towards the object 320 and the wall 324, respectively. In another example, the angle of arrival of the reflected waveforms 318A and 318C can be adjusted based on the movement and orientation of the wireless device 302 at the time it transmitted the waveform 316A versus the time the wireless device 302 received the reflected waveforms 318A and 318C.

In some implementations, the wireless device 302 can utilize the time of flight, distance, angle of arrival, location data, orientation data, or some combination thereof to determine a size and/or position of the object 320 and/or the wall 324.

In some implementations, the wireless device 302 can use the distance, angle of arrival, location, and orientation data to create a map of the indoor environment 300 that includes references to the object 320 and the wall 324. In the same or alternative implementations, the wireless device 302 can use the RF sensing data to modify a partial map that it receives from a computing device, such as the device 100 of FIG. 1. In other aspects, the wireless device 302 can send the RF sensing data to a server for processing and creation of a map of the indoor environment 300.

As an illustrative example, the AP 304 and the wireless device 302 can be configured to implement a bistatic configuration in which the transmit and receive functions are performed by different devices. For example, the AP 304 (and/or another device within the indoor environment 300 that is static or stationary) can transmit an omnidirectional RF signal that can include the signals 328A and 328B. As illustrated, the signal 328A can travel directly (e.g., no reflections) from the AP 304 to the wireless device 302. The signal 328B can reflect off of a wall 326 and cause a corresponding reflected signal 328C to be received by the wireless device 302.

As another example, the wireless device 302 can utilize RF sensing data associated with the direct signal path (e.g., the signal 328A) and the reflected signal path (e.g., the signal 328C) to identify the size and shape of reflectors (e.g., the wall 326). For instance, the wireless device 302 can obtain, retrieve, and/or estimate location data associated with the AP 304. In some implementations, the wireless device 302 can use location data associated with the AP 304 and RF sensing data (e.g., CSI data) to determine time of flight, distance, and/or angle of arrival associated with signals transmitted by the AP 304 (e.g., direct path signals such as the signal 328A and reflected path signals such as the signal 328C). In some cases, the wireless device 302 and the AP 304 can further send and/or receive communication that can include data associated with the RF signal 328A and/or the reflected signal 328C (e.g., transmission time, sequence/pattern, time of arrival, time of flight, angle of arrival, etc.).

In some implementations, the AP 304 and/or the wireless device 302 can be configured to implement a monostatic configuration in which the transmit and receive functions are performed by the same device. For example, the AP 304 and/or the wireless device (and/or another device within the indoor environment 300 that is static or stationary) can perform RF sensing techniques irrespective of their association with each other or with a Wi-Fi network. For example, the wireless device 302 can utilize its Wi-Fi transmitter and Wi-Fi receiver to perform RF sensing as discussed herein when it is not associated with any access point or Wi-Fi network. In further examples, the AP 304 can perform RF sensing techniques regardless of whether it has any wireless devices associated with it.

In some implementations, the wireless device 302 and the AP 304 can exchange data relating to their respective indoor maps for the indoor environment 300 to create a map that includes references to all reflectors (e.g., static objects, dynamic objects, structural elements) detected by both the wireless device 302 and the AP 304. In the same or alternative implementations, the RF sensing data from the wireless device 302 and the AP 304 can be sent to one or more servers that can aggregate the data to generate or modify a map.

As an illustrative example, a server device can obtain (e.g., crowdsource) RF sensing data from a plurality of wireless devices located within an indoor environment (e.g., the indoor environment 300). The server device can use the RF sensing data from multiple devices to identify and classify different reflectors. For example, the server device may determine that a reflector is a transient object (e.g., a pet or a human walking through the environment) by using the RF sensing data to track movement of the object or by determining that data corresponding to the object was temporal and/or not confirmed by RF sensing data from other wireless devices. In some implementations, the server device can omit and/or remove references to transient objects from an indoor map. In another example, a computing device may use RF sensing data from a plurality of wireless devices to determine that a reflector corresponds to a structural element such as a door, a window, a wall, a floor, a ceiling, a roof, a column, a staircase, or any combination thereof. In the same or alternative implementations, a computing device can include a reference in a map that indicates a type of structural element. In some cases, a computing device may use RF sensing data from a plurality of wireless devices to determine that a reflector corresponds to a static object such as a piece of furniture, an appliance, a fixture (e.g., blinds/shades, ceiling fans, plants, rugs, lamps, etc.). In some examples, a computing device can include a reference in an indoor map that indicates a type of static object.

In some implementations, the wireless device 302 and/or the AP 304 can be configured to communicate mapping data associated with the indoor environment 300 to the device 100. For example, the wireless device 302 and/or the AP 304 can be configured to communicate the distance between the wireless device 302 and the object 320 within the indoor environment 300. As an additional example, the wireless device 302 and/or the AP 304 can be configured to communicate the distance between the AP 304 (and/or the wireless device 302) and one or more of the walls 322, 324, and 326. In some implementations, the mapping data can be communicated to the device 100 as some or all of the first audio environment description 114.

As described in more detail above with reference to FIG. 1, the device 100 can be configured to determine, based on the mapping data, a geometry of a mutual audio environment. The device 100 can, in some implementations, also be configured to process audio data, based on the geometry of the mutual audio environment, for output at one or more audio devices disposed in the indoor environment 300. The device 100 can also be configured to communicate the processed second audio data 168 to the indoor environment 300 (e.g., the first audio environment 124), as described in more detail above with reference to FIG. 1.

Figure 4C:
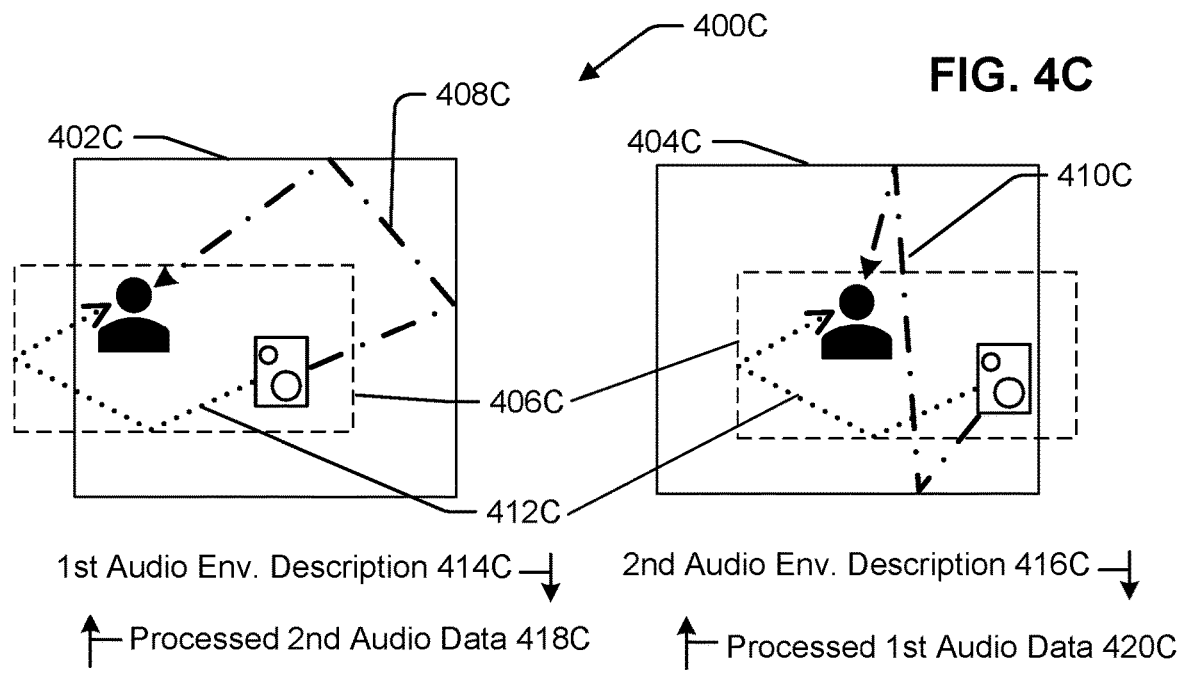
FIG. 4C illustrates a third exemplary audio environment configuration including a first audio environment, a second audio environment, and a virtual, mutual audio environment, in accordance with some examples of the present disclosure.

FIGS. 2-3 illustrate various implementations in which various electronic devices (e.g., the wireless device 200, 224 of FIG. 2, the wireless device 302 of FIG. 3, and/or the AP 304 of FIG. 3) can map an audio environment for use by the device 100 in selecting a virtual, mutual audio environment (e.g., the mutual audio environment geometry 118 of FIG. 1). As described in more detail above with reference to FIG. 1, the mutual audio environment selector 110 can select a mutual audio environment geometry for one or more audio environments, and the device 100 can process audio data, based on the geometry of the mutual environment, for output at one or more of the audio environments (e.g., the first and second audio environments 124 and 126 of FIG. 1). FIGS. 4A-4C illustrate a plurality of exemplary audio environment configurations including a virtual, mutual audio environment.

FIG. 4A illustrates a first exemplary audio environment configuration 400A including a first audio environment 402A, a second audio environment 404A, and a virtual, mutual audio environment 406A, in accordance with some examples of the present disclosure. Generally, the first audio environment 402A corresponds to the first audio environment 124 of FIG. 1, and the second audio environment 404A corresponds to the second audio environment 126 of FIG. 1.

FIG. 4A illustrates the second audio environment 404A as smaller in size than the first audio environment 402A. Accordingly, the exemplary sound path 410A along which sound can travel to the user of the second audio environment 404A is shorter than the exemplary sound path 408A along which sound can travel to the user of the first audio environment 402A. The users of the first and second audio environments 402A and 404A can, therefore, experience sound differently due to the differing acoustical properties of sound traveling along the different sound paths 408A and 410A.

As described in more detail above, the device 100 of FIG. 1 can determine a virtual, mutual audio environment 406A for the first and/or second audio environments 402A and 404A. In the illustrative example of FIG. 4A, the dimensions of the second audio environment 404A are such that the second audio environment 404A could spatially fit within the dimensions of the first audio environment 402A. As described in more detail above with reference to FIGS. 1-3, an electronic device within the first audio environment 402A (e.g., the user device 152 of FIG. 1) can communicate a first audio environment description 414A to the device 100 of FIG. 1, while the second audio environment 404A can communicate a second audio environment description 416A to the device 100 of FIG. 1.

In some implementations, the device 100 can determine that the mutual audio environment 406A can have the same dimensions of one or more of the individual audio environments. For example, FIG. 4A illustrates the mutual audio environment 406A as having the same dimensions as the second audio environment 404A. In a particular configuration, therefore, the device 100 can be configured to only process audio for output at the first audio environment 402A. For example, the device 100 can communicate processed second audio data 418A to the first audio environment 402A. As described in more detail above with reference to FIG. 1, the processed second audio data 418A can have acoustical characteristics that allow the user of the first audio environment 402A to hear the processed second audio data 418A as though the user of the first audio environment 402A were disposed within the mutual audio environment 406A rather than within the first audio environment 402A. Accordingly, the user of the first audio environment 402A can experience sound that travels an exemplary sound path 412A (rather than the sound path 408A), which is substantially similar to the exemplary sound path 410A. Thus, users of both the first and second audio environments 402A and 404A can experience sound having substantially similar acoustical characteristics, improving the natural experience of communication between the exemplary audio environments.

FIG. 4B illustrates a second exemplary audio environment configuration 400B including a first audio environment 402B, a second audio environment 404B, and a virtual, mutual audio environment 406B. Generally, the first audio environment 402B corresponds to the first audio environment 124 of FIG. 1, and the second audio environment 404B corresponds to the second audio environment 126 of FIG. 1.

While FIG. 4A illustrates the second audio environment 404A as smaller in size than the first audio environment 402A, FIG. 4B illustrates the first and second audio environments 402B and 404B as having dissimilar geometries where the dimensions of one audio environment cannot be readily translated to the other audio environment. Further, the exemplary sound path 408B along which sound can travel to the user of the first audio environment 402B and the exemplary sound path 410B along which sound can travel to the user of the second audio environment 404B can differ. The users of the first and second audio environments 402B and 404B can, therefore, experience sound differently due to the differing acoustical properties of sound traveling along the different sound paths 408B and 410B.

As described in more detail above, the device 100 of FIG. 1 can determine a virtual, mutual audio environment 406B for the first and/or second audio environments 402B and 404B. In the illustrative example of FIG. 4B, an electronic device within the first audio environment 402B (e.g., the user device 152 of FIG. 1) can communicate a first audio environment description 414B to the device 100 of FIG. 1, while the second audio environment 404B can communicate a second audio environment description 416B to the device 100 of FIG. 1. In some implementations, the device 100 can determine a mutual audio environment geometry having arbitrary dimensions that do not match the dimensions of either the first or second audio environments 402B, 404B. For example, FIG. 4B illustrates the mutual audio environment 406B as having the dimensions of a substantially rectangular area that can fit within both the first and second audio environments 402B and 404B. A substantially rectangular area may be chosen to, for example, lessen the amount of processing resources needed to process the audio data.

In a particular configuration, therefore, the device 100 can be configured to process audio for output at both the first and second audio environments 402B and 404B according to the geometry of the mutual audio environment 406B. For example, the device 100 can communicate processed second audio data 418B to the first audio environment 402B and processed first audio data 420B to the second audio environment 404B. As described in more detail above with reference to FIG. 1, the processed first and second audio data 418B and 420B can have acoustical characteristics that allow the users of the first and second audio environments 402B and 404B to hear audio as though the users were disposed within the mutual audio environment 406B rather than the user's respective actual audio environment. Accordingly, the users of the first and second audio environments 402B and 404B can experience sound that travels an exemplary sound path 412B. Thus, users of both the first and second audio environments 402B and 404B can experience sound having substantially similar acoustical characteristics, improving the natural experience of communication between the exemplary audio environments.

FIG. 4C illustrates a third exemplary audio environment configuration 400C including a first audio environment 402C, a second audio environment 404C, and a virtual, mutual audio environment 406C, in accordance with some examples of the present disclosure. Generally, the first audio environment 402C corresponds to the first audio environment 124 of FIG. 1, and the second audio environment 404C corresponds to the second audio environment 126 of FIG. 1.

While FIG. 4A illustrates the use of the actual dimensions of the second audio environment 404A as the dimensions of the mutual audio environment 406A, FIG. 4C illustrates the use of a mutual audio environment 406C with arbitrary dimensions to account for the differing positions of the users of the first and second audio environments 402C and 404C. In FIG. 4C, the exemplary sound path 408C along which sound can travel to the user of the first audio environment 402C and the exemplary sound path 410C along which sound can travel to the user of the second audio environment 404C can differ. The users of the first and second audio environments 402C and 404C can, therefore, experience sound differently due to the differing acoustical properties of sound traveling along the different sound paths 408C and 410C.

As described in more detail above, the device 100 of FIG. 1 can determine a virtual, mutual audio environment 406C for the first and/or second audio environments 402C and 404C. In the illustrative example of FIG. 4C, an electronic device within the first audio environment 402C (e.g., the user device 152 of FIG. 1) can communicate a first audio environment description 414C to the device 100 of FIG. 1, while the second audio environment 404C can communicate a second audio environment description 416C to the device 100 of FIG. 1. In some implementations, the device 100 can determine a mutual audio environment geometry having arbitrary dimensions that neither match nor fit within the real-world dimensions of either the first or second audio environments 402C, 404C. For example, FIG. 4C illustrates the mutual audio environment 406C as having the dimensions of a substantially rectangular area that lies outside the physical dimensions of both the first and second audio environments 402C and 404C. A substantially rectangular area may be chosen to, for example, lessen the amount of processing resources needed to process the audio data.

In a particular configuration, therefore, the device 100 can be configured to process audio for output at both the first and second audio environments 402C and 404C according to the geometry of the mutual audio environment 406C. For example, the device 100 can communicate processed second audio data 418C to the first audio environment 402C and processed first audio data 420C to the second audio environment 404C. As described in more detail above with reference to FIG. 1, the processed first and second audio data 418C and 420C can have acoustical characteristics that allow the users of the first and second audio environments 402C and 404C to hear audio as though the users were disposed within the mutual audio environment 406C rather than the user's respective actual audio environment. Accordingly, the users of the first and second audio environments 402C and 404C can experience sound that travels an exemplary sound path 412C. Thus, users of both the first and second audio environments 402C and 404C can experience sound having substantially similar acoustical characteristics, improving the natural experience of communication between the exemplary audio environments.

Figure 4D:
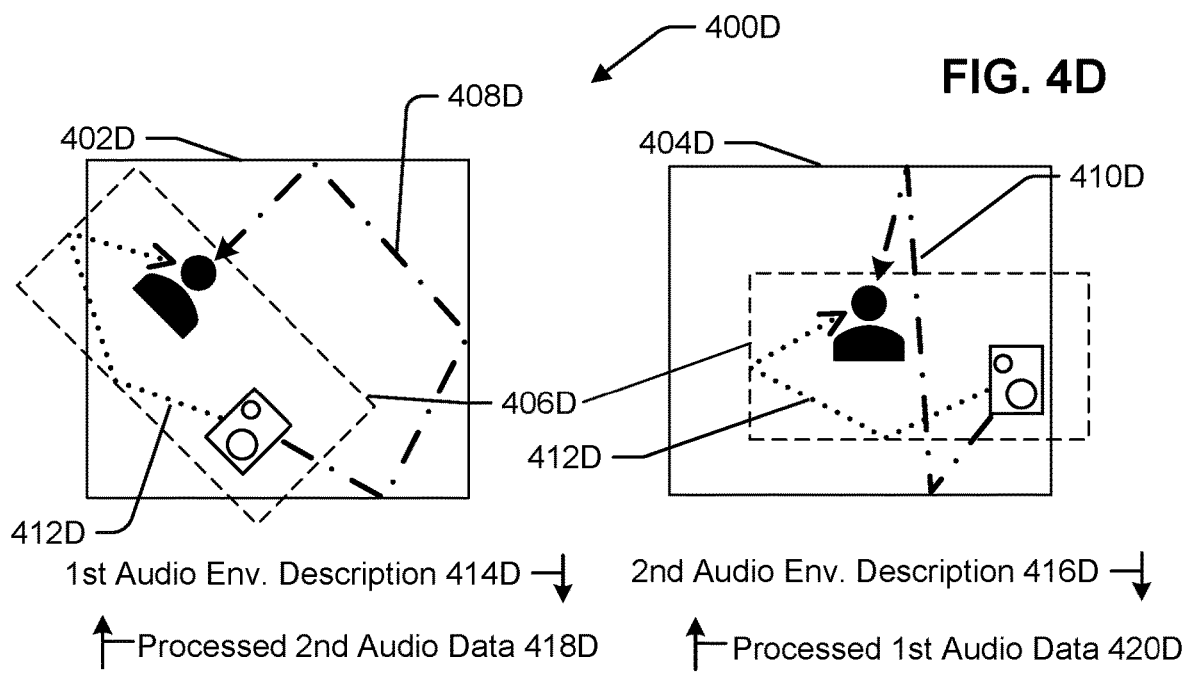
FIG. 4D illustrates a fourth exemplary audio environment configuration including a first audio environment, a second audio environment, and a virtual, mutual audio environment, in accordance with some examples of the present disclosure.

FIG. 4D illustrates a fourth exemplary audio environment configuration 400D including a first audio environment 402D, a second audio environment 404D, and a virtual, mutual audio environment 406D, in accordance with some examples of the present disclosure. Generally, the first audio environment 402D corresponds to the first audio environment 124 of FIG. 1, and the second audio environment 404D corresponds to the second audio environment 126 of FIG. 1.

While FIG. 4A illustrates the use of the actual dimensions of the second audio environment 404A as the dimensions of the mutual audio environment 406A, FIG. 4D illustrates the use of a mutual audio environment 406D with arbitrary dimensions to account for differing orientations of the users with respect to the first and second audio environments 402D and 404D, respectively. In FIG. 4D, the exemplary sound path 408D along which sound can travel to the user of the first audio environment 402D and the exemplary sound path 410D along which sound can travel to the user of the second audio environment 404D can differ. The users of the first and second audio environments 402D and 404D can, therefore, experience sound differently due to the differing acoustical properties of sound traveling along the different sound paths 408D and 410D.

As described in more detail above, the device 100 of FIG. 1 can determine a virtual, mutual audio environment 406D for the first and/or second audio environments 402D and 404D. In the illustrative example of FIG. 4D, an electronic device within the first audio environment 402D (e.g., the user device 152 of FIG. 1) can communicate a first audio environment description 414D to the device 100 of FIG. 1, while the second audio environment 404D can communicate a second audio environment description 416D to the device 100 of FIG. 1. In some implementations, the device 100 can determine a mutual audio environment geometry having arbitrary dimensions that neither match nor fit within the real-world dimensions of either the first or second audio environments 402D, 404D. For example, FIG. 4D illustrates the mutual audio environment 406D as having the dimensions of a substantially rectangular area that lies outside the physical dimensions of both the first and second audio environments 402D and 404D. A substantially rectangular area may be chosen to, for example, lessen the amount of processing resources needed to process the audio data.

In a particular configuration, therefore, the device 100 can be configured to process audio for output at both the first and second audio environments 402D and 404D according to the geometry of the mutual audio environment 406D. For example, the device 100 can communicate processed second audio data 418D to the first audio environment 402D and processed first audio data 420D to the second audio environment 404D. As described in more detail above with reference to FIG. 1, the processed first and second audio data 418D and 420D can have acoustical characteristics that allow the users of the first and second audio environments 402D and 404D to hear audio as though the users were disposed within the mutual audio environment 406D rather than the user's respective actual audio environment. Accordingly, the users of the first and second audio environments 402D and 404D can experience sound that travels an exemplary sound path 412D. Thus, users of both the first and second audio environments 402D and 404D can experience sound having substantially similar acoustical characteristics, improving the natural experience of communication between the exemplary audio environments.

FIGS. 4A-4D illustrate various exemplary audio environment configurations that each include a first audio environment, a second audio environment, and a virtual, mutual audio environment. Although FIGS. 4A-4D illustrate certain exemplary configurations, other configurations are possible without departing from the scope of the present disclosure.

For example, the mutual audio environment can correspond to a volume representing an intersection of the two or more audio environments. As an additional example, the mutual audio environment can correspond to a virtual space distinct from each of the two or more audio environments.

Further, determining the geometry of the mutual audio environment can include determining a mutual coordinate system based on the data descriptive of the two or more audio environments. In some implementations, the processor(s) 102 of FIG. 1 can associate a first position in the mutual coordinate system with a first sound source of the first audio environment 124 and associate a second position in the mutual coordinate system with a second sound source in the second audio environment 126. In a particular implementation, the processor(s) 102 of FIG. 1 can be further configured to map a gaze direction of a user in a particular audio environment to the mutual coordinate system. The gaze direction of the user (e.g., the user 132 of the first audio environment 124) can be determined by the user device 152 or from another suitable source. The processor(s) 102 can then generate, based on the gaze direction, a visual rendering of the mutual audio environment. By generating a visual rendering of the mutual audio environment, the device 100 of FIG. 1 can further enhance the experience of the user 132 by allowing the user 132 to "see" the mutual audio environment as well as processing audio data to appear to the user 132 as though the sound originated within the mutual audio environment.

Using a mutual coordinate system based on the data descriptive of the first and second audio environments 124, 126, the processor(s) 102 can determine a geometry of a mutual audio environment that can facilitate augmenting communications in both the first and second audio environments 124, 126.

As described in more detail above with reference to FIGS. 1-3, the device 100 of FIG. 1 can be configured to process audio data, based on the geometry of the mutual audio environment, for output at an audio device disposed in one or more of the audio environments. By augmenting audio for communication in this manner, users within the one or more audio environments can experience audio in a more natural manner.

Figure 5:
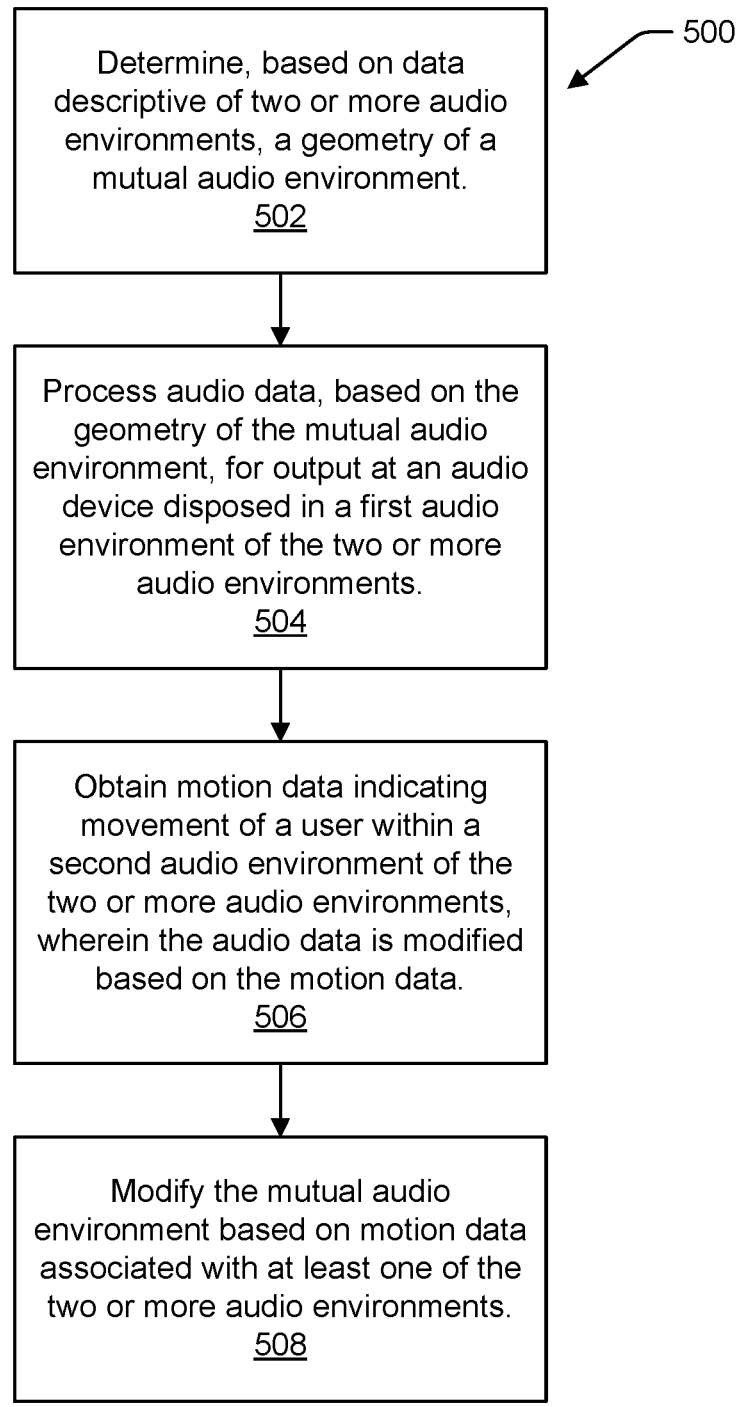
FIG. 5 is a flow chart of an example of a method for augmenting audio for communications, in accordance with some examples of the present disclosure.

FIG. 5 is a flow chart of an example of a method 500 for augmenting audio for communications, in accordance with some examples of the present disclosure. The method 500 may be initiated, performed, or controlled by one or more processors executing instructions, such as by the processor(s) 102 of FIG. 1 executing instructions from the memory 104.

In some implementations, the method 500 includes, at 502, determining, based on data descriptive of two or more audio environments, a geometry of a mutual audio environment. For example, the processor(s) 102 of FIG. 1 can select the mutual audio environment geometry 118 based on the first audio environment description 114 and the second audio environment description 116, as described in more detail above with reference to FIGS. 1-4D.

In the example of FIG. 5, the method 500 also includes, at 504, processing audio data, based on the geometry of the mutual audio environment, for output at an audio device disposed in a first audio environment of the two or more audio environments. For example, the processor(s) of FIG. 1 can process the second audio data 130 from the second audio environment 126 according to the mutual audio environment geometry 118 to become the processed second audio data 168 for output to the user device 152 disposed in the first audio environment 124. In a particular example, the processor(s) of FIG. 1 can process the second audio data 130 based on the exemplary mutual audio environment 140.

In the example of FIG. 5, the method 500 also includes, at 506, obtaining motion data indicating movement of a user within a second audio environment of the two or more audio environments, wherein the audio data is modified based on the motion data. For example, the processor(s) 102 of FIG. 1 can obtain motion data indicating movement of the user 132 within the first audio environment 124. The processor(s) 102 can be further configured to modify the first audio data 128 to account for the movement of the user 132 within the first audio environment 124. In a particular example, as described in more detail above with reference to FIGS. 1 and 3, the processor(s) 102 can modify the first audio data to account for the movement of the user 132 carrying the wireless device 302 of FIG. 3 within the first audio environment 124.

In the example of FIG. 5, the method 500 also includes, at 508, modifying the mutual audio environment based on motion data associated with at least one of the two or more audio environments. For example, the processor(s) 102 of FIG. 1 can modify the exemplary mutual audio environment 140 based on motion data associated with the user 132 of the first audio environment 124. In a particular example, the processor(s) 102 of FIG. 1 can modify the exemplary mutual audio environment 140 to account for the user's change in position and/or orientation relative to the audio environment, as described in more detail above with reference to FIGS. 4C-4D.

Although the method 500 is illustrated as including a certain number of operations, more, fewer, and/or different operations can be included in the method 500 without departing from the scope of the present disclosure. For example, the method 500 can exclude obtaining motion data indicating movement of a user, as described in more detail above with reference to FIGS. 1-4D. As an additional example, the method 500 can vary depending on the number of audio environments participating in a particular communication.

In some implementations, the method 500 can repeat one or more of 502-508 periodically and/or continuously. For example, the method 500 can determine a geometry of a mutual audio environment after an elapsed time (e.g., five seconds) to account for changes in a user's position, orientation, gaze angle, and/or other changes in the user's experience of the acoustical properties of sound signals within the user's audio environment. In some implementations, the processor(s) 102 of FIG. 1 can be configured to modify the mutual audio environment based on motion data within the user's audio environment. Modifying the mutual audio environment can include, for example, shifting boundaries of the mutual audio environment relative to one or more sound sources of the mutual audio environment, changing a shape of the geometry of the mutual audio environment, changing a size of the mutual audio environment, and/or some combination thereof.

Further, although the examples provided above in illustrating method 500 include the processor(s) 102 of FIG. 1 performing operations of the method 500, some or all of the operations of the method 500 can be performed by any suitable computing device. For example, as described above with reference to 504, the method 500 can include processing audio data, based on the geometry of the mutual audio environment, for output at an audio device disposed in a first audio environment of the two or more audio environments. In some configurations, the device 100 can process the audio data prior to communicating the processed audio data to the audio device for output. In the same or alternative configurations, the audio device can process the audio data for output after receiving audio data from the device 100. As an additional example, the determination of the mutual audio environment geometry (e.g., as described above with reference to 502) can be performed by one or more servers in communication with the processor(s) 102 of FIG. 1.

Figure 6:
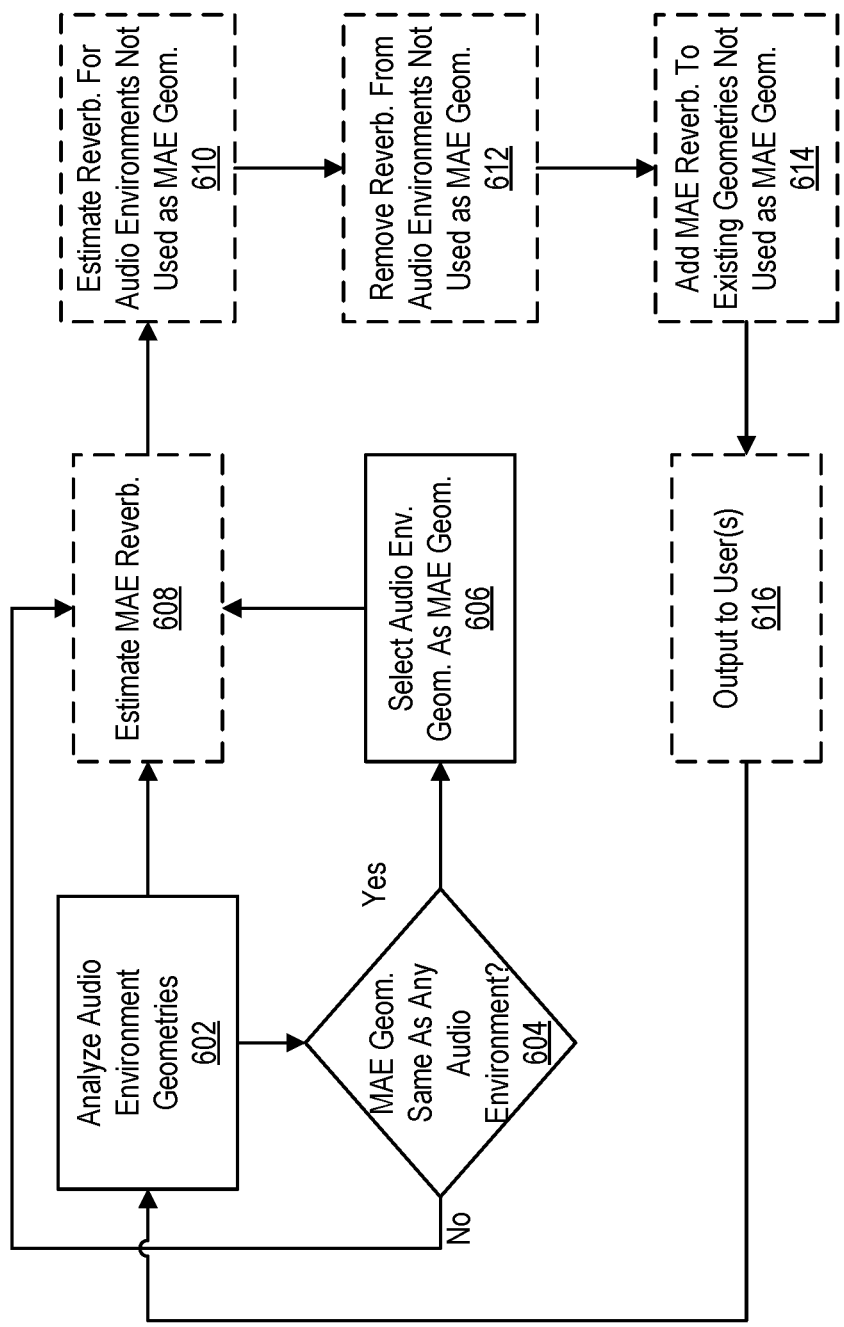
FIG. 6 is a flow chart of another example of a method for augmenting audio for communications, in accordance with some examples of the present disclosure.

FIG. 6 is a flow chart of another example of a method 600 for augmenting audio for communications. The method 600 may be initiated, performed, or controlled by one or more processors executing instructions, such as by the processor(s) 102 of FIG. 1 executing instructions from the memory 104.

In the example of FIG. 6, the method 600 includes, at 602, analyzing audio environment geometries. In some implementations, analyzing the audio environment geometries can include determining a virtual, mutual audio environment. For example, as described in more detail above with reference to FIGS. 1-5, the processor(s) 102 of FIG. 1 can analyze the first and second audio environment descriptions 114 and 116 from the first and second audio environments 124 and 126, respectively, to determine a geometry associated with each of the first and second audio environments 124 and 126. The processor(s) 102 can be further configured to select a mutual audio environment geometry 118 that can be used to augment audio for communication in one or more of the first and second audio environments 124 and 126.

In the example of FIG. 6, the method 600 also includes, at 604, determining whether the mutual audio environment geometry is the same as or substantially similar (e.g., based on one or more thresholds) to the geometry of any audio environment (e.g., the geometry of the first audio environment 124 and/or the geometry of the second audio environment 126). In the example of FIG. 6, if the mutual audio environment is the same as or substantially similar to the geometry of an audio environment, the method 600 can proceed to, at 606, select the audio environment geometry that is the same or substantially similar to the mutual audio environment geometry.

In certain configurations, the method 600 can optionally include further processing, as illustrated by the dashed lines of FIG. 6. For example, in the example of FIG. 6, if the mutual audio environment geometry is not the same as or substantially similar to the mutual audio environment geometry, the method 600 can also proceed to, at 608, estimate one or more acoustical properties associated with the mutual audio environment ("MAE") as described above.

In the example of FIG. 6, the method 600 can also optionally include, at 608, estimating one or more acoustical properties associated with the mutual audio environment ("MAE"). In some implementations, the acoustical properties can include reverberation associated with a particular sound source within the mutual audio environment. For example, the processor(s) 102 of FIG. 1 can analyze one or more sounds sources generating audio data (e.g., first audio data 128 and/or second audio data 130) and determine what reverberation characteristics the audio data would have within the mutual audio environment. In some configurations, the processor(s) 102 can be configured to estimate the reverberation by calculating a room impulse response associated with the audio data within the mutual audio environment using an image source model.

In the example of FIG. 6, the method 600 can also optionally include, at 610, estimating certain acoustical properties associated with the audio environments that do not have a geometry that is the same as or substantially similar to the geometry of the mutual audio environment. For example, the processor(s) 102 of FIG. 1 can estimate a reverberation associated with the first audio data 128 from the first audio environment 124 if the geometry of the first audio environment 124 is not the same as or substantially similar to the geometry of the mutual audio environment. The processor(s) 102 can be configured to estimate the reverberation by calculating a room impulse response associated with the audio data within the mutual audio environment using an image source model.

In the example of FIG. 6, the method 600 can also optionally include, at 612, processing audio data from the audio environments that do not have a geometry that is the same as or substantially similar to the geometry of the mutual audio environment to modify one or more acoustical properties of the audio data (e.g., to remove reverberation characteristics). For example, the processor(s) 102 of FIG. 1 can be configured to process the first audio data 128 to remove any reverberation associated with the first audio data 128 within the first audio environment 124 if the geometry of the first audio environment 124 is not the same as or substantially similar to the geometry of the mutual audio environment. In some configurations, this can include using the estimated reverberation described above with reference to 610.

In the example of FIG. 6, the method 600 can also optionally include, at 614, adding the reverberation associated with the mutual audio environment to audio data associated with an audio environment that does not have a geometry that is the same as or substantially similar to the geometry of the mutual audio environment. For example, the processor(s) 102 of FIG. 1 can be configured to convolve one or more audio-altering signals (e.g., the reverberation associated with the mutual audio environment) with the processed audio data from an audio environment (e.g., the processed first audio data 170 if the first audio environment 124 does not have a geometry that is the same as or substantially similar to the geometry of the mutual audio environment). As an additional example, the processor(s) 102 of FIG. 1 can be configured to reduce reverberation associated with one or more of the audio environments.

In the example of FIG. 6, the method 600 can also optionally include, at 616, outputting the processed audio data to one or more users. For example, the processor(s) 102 of FIG. 1 can be configured to communicate the processed first audio data 170 to the first audio environment 124 and/or the second audio environment 126. In some configurations, the processor(s) 102 can be configured to communicate the processed first audio data 170 to the one or more output components 160 and/or output component(s) 166 (e.g., one or more speakers).

Although the method 600 is illustrated as including a certain number of operations, more, fewer, and/or different operations can be included in the method 600 without departing from the scope of the present disclosure. For example, the method 600 can include a determination of whether to further alter the processed audio data, as described in more detail below with reference to FIG. 18. As an additional example, the method 600 can vary depending on the number of audio environments participating in a particular communication. As a further example, the method 600 can communicate a subset of processed audio data to all users.

Further, although the examples provided above in illustrating method 600 describe the processor(s) 102 of FIG. 1 performing the operations of the method 600, some or all of operations of the method 600 can be performed by any suitable computing device. For example, the method 600 can include determining whether to further modify the processed audio data prior to communicating the processed audio data to one or more users. In some configurations, the device 100 can send the simulated reverberation 108 separately from the processed audio data and a computing device within the individual audio environment can further process the communicated audio data (e.g., by convolving the processed audio data with the simulated reverberation). As an additional example, the determination of the mutual audio environment geometry (e.g., as described above with reference to 602-606) can be performed by one or more servers in communication with the processor(s) 102 of FIG. 1.

Figure 7:
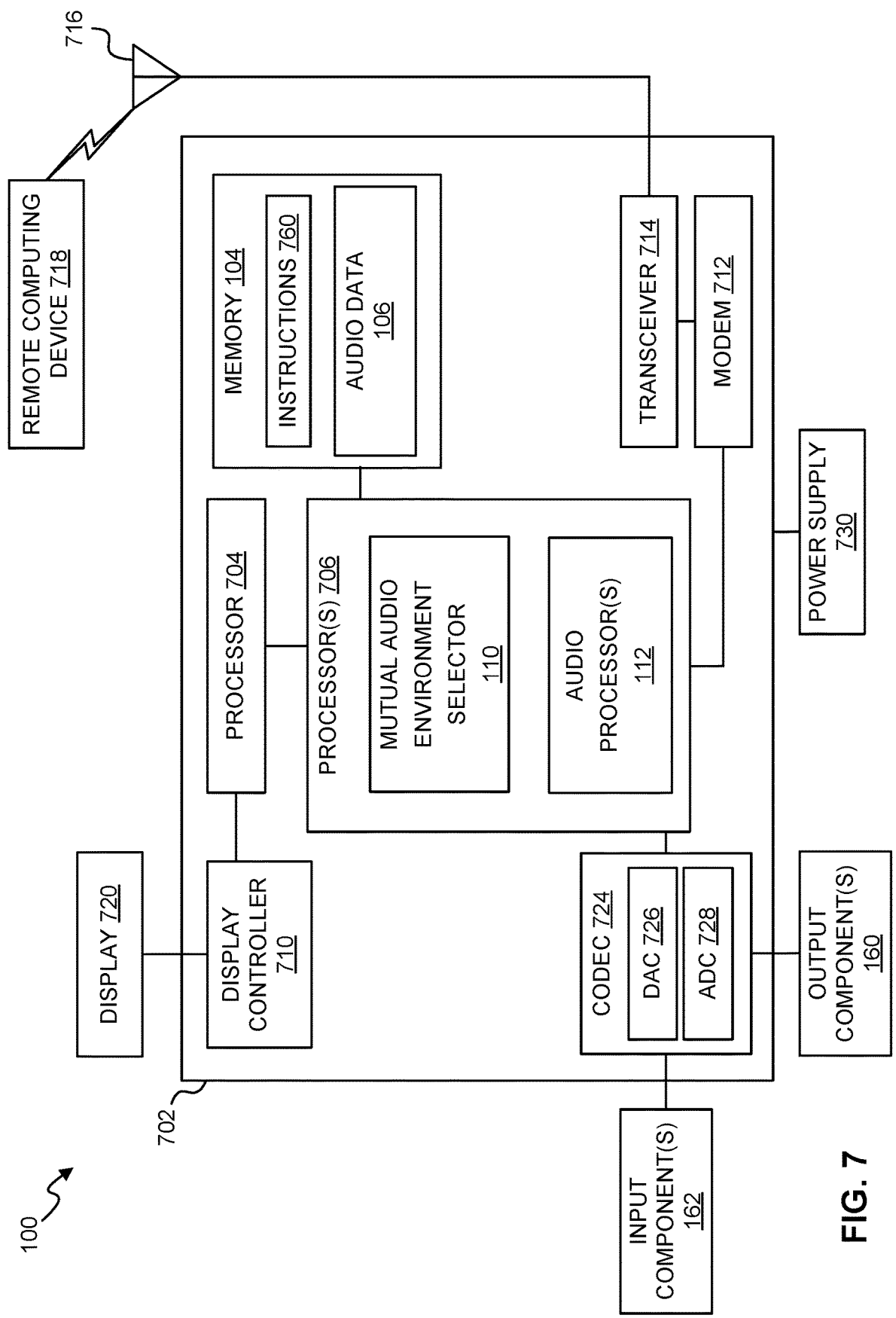
FIG. 7 is a block diagram illustrating a particular example of the device of FIG. 1, in accordance with some examples of the present disclosure.

FIG. 7 is a block diagram illustrating a particular example of the device 100 of FIG. 1, in accordance with some examples of the present disclosure. In various implementations, the device 100 may have more or fewer components than illustrated in FIG. 7.

In a particular implementation, the device 100 includes a processor 704 (e.g., a central processing unit (CPU)). The device 100 may include one or more additional processor(s) 706 (e.g., one or more digital signal processors (DSPs)). The processor 704, the processor(s) 706, or both, may correspond to the one or more processors 102 of FIG. 1. For example, in FIG. 7, the processor(s) 706 include the mutual audio environment selector 110 and the audio processor(s) 112.

In FIG. 7, the device 100 also includes the memory 104 and a CODEC 724. The memory 104 stores instructions 760 that are executable by the processor 704, and/or the processor(s) 706, to implement one or more operations described with reference to FIGS. 1-6. In an example, the memory 104 corresponds to a non-transitory computer-readable medium that stores the instructions 760 executable by the one or more processors 102, and the instructions 760 include or correspond to (e.g., are executable by a processor to perform operations attributed to) the mutual audio environment selector 110, the audio processor(s) 112, or a combination thereof. The memory 104 may also store the audio data 106 (and/or the simulated reverberation 108 of FIG. 1).

In FIG. 7, the input component(s) 162 and/or the output component(s) 160 may be coupled to the CODEC 724. In the example illustrated in FIG. 7, the CODEC 724 includes a digital-to-analog converter (DAC 726) and an analog-to-digital converter (ADC 728). In a particular implementation, the CODEC 724 receives analog signals from the input component(s) 162 (e.g., the first audio data 128 of FIG. 1), converts the analog signals to digital signals using the ADC 728, and provides the digital signals to the processor(s) 706. In a particular implementation, the processor(s) 706 provide digital signals to the CODEC 724, and the CODEC 724 converts the digital signals to analog signals using the DAC 726 and provides the analog signals (e.g., the processed second audio data 168 of FIG. 1) to the output component(s) 160.

In FIG. 7, the device 100 also includes a display 720 coupled to a display controller 710. In some implementations, the device 100 also includes a modem 712 coupled to a transceiver 714. In FIG. 7, the transceiver 714 is coupled to an antenna 716 to enable wireless communication with other devices, such as the remote computing device 718 (e.g., a server or network memory storing at least a portion of the mutual audio environment geometry 118). For example, the modem 712 may be configured to receive a portion of the audio data 106 (e.g., the second audio data 130) from the remote computing device 718 via wireless transmission. In other examples, the transceiver 714 is also, or alternatively, coupled to a communication port (e.g., an ethernet port) to enable wired communication with other devices, such as the remote computing device 718.

In a particular implementation, the device 100 is included in a system-in-package or system-on-chip device 702. In a particular implementation, the memory 104, the processor 704, the processor(s) 706, the display controller 710, the CODEC 724, the modem 712, and the transceiver 714 are included in the system-in-package or system-on-chip device 702. In a particular implementation, a power supply 730 is coupled to the system-in-package or system-on-chip device 702. Moreover, in a particular implementation, as illustrated in FIG. 7, the display 720, the input component(s) 162, the output component(s) 160, the antenna 716, and the power supply 730 are external to the system-in-package or system-on-chip device 702. In a particular implementation, each of the display 720, the input component(s) 162, the output component(s) 160, the antenna 716, and the power supply 730 may be coupled to a component of the system-in-package or system-on-chip device 702, such as an interface or a controller.

The device 100 may include, correspond to, or be included within a voice activated device, an audio device, a wireless speaker and voice activated device, a portable electronic device, a car, a vehicle, a computing device, a communication device, an internet-of-things (IoT) device, a virtual reality (VR) device, an augmented reality (AR) device, a mixed reality (MR) device, a smart speaker, a mobile computing device, a mobile communication device, a smart phone, a cellular phone, a laptop computer, a computer, a tablet, a personal digital assistant, a display device, a television, a gaming console, an appliance, a music player, a radio, a digital video player, a digital video disc (DVD) player, a tuner, a camera, a navigation device, or any combination thereof. In a particular aspect, the processor 704, the processor(s) 706, or a combination thereof, are included in an integrated circuit.

Figure 8:
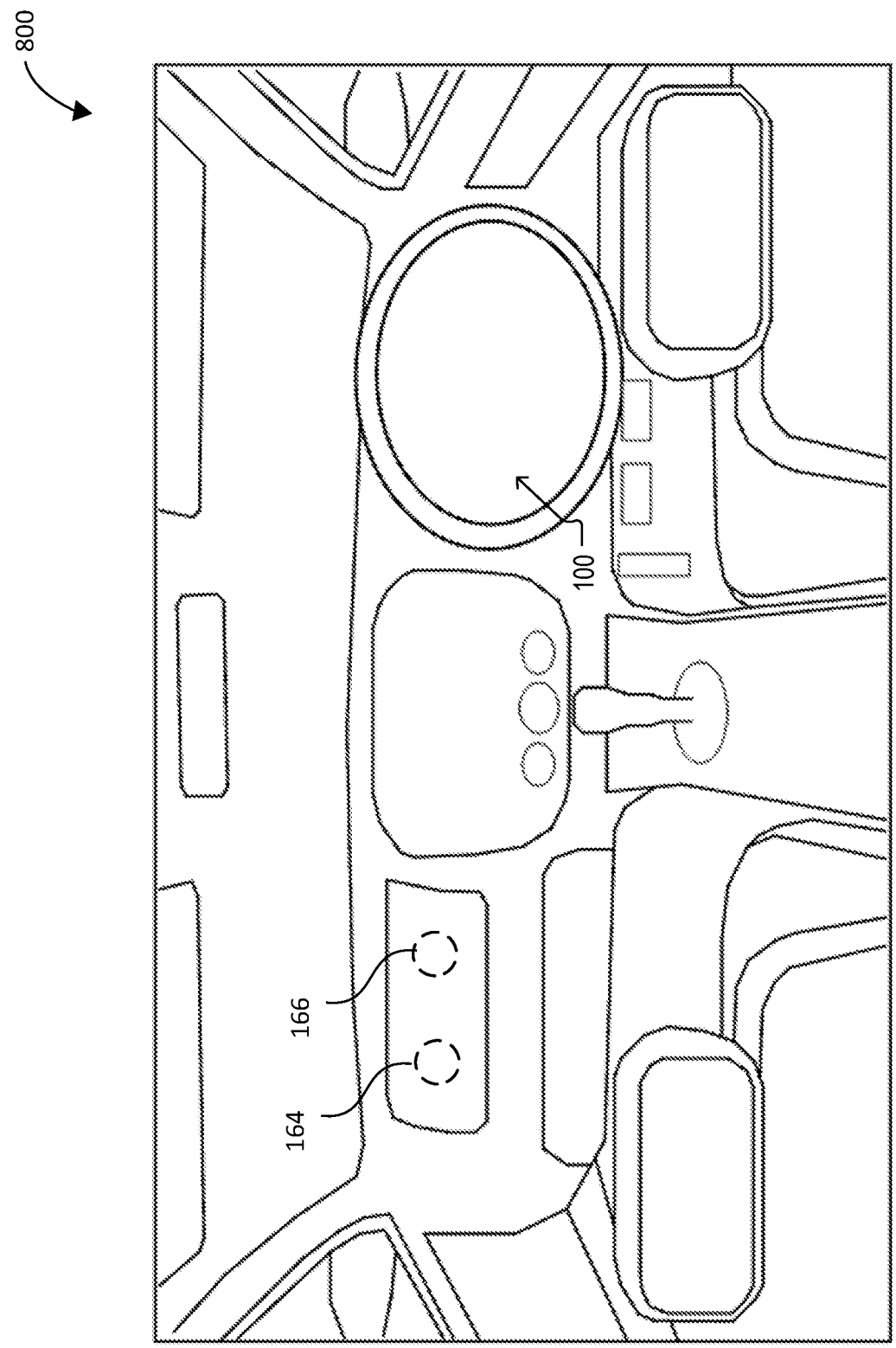
FIG. 8 illustrates a vehicle that incorporates aspects of the device of FIG. 1, in accordance with some examples of the present disclosure.

FIG. 8 illustrates an example of a vehicle 800 that incorporates aspects of the device 100 of FIG. 1. According to one implementation, the vehicle 800 is a self-driving car. According to other implementations, the vehicle 800 is a car, a truck, a motorcycle, an aircraft, a water vehicle, etc. In FIG. 8, the vehicle 800 includes the display 720, the device 100, one or more input components 164, one or more output components 166, or some combination thereof. The one or more input components 164 and/or the one or more output components 166 are illustrated in dashed lines because they may or may not be visible to the user of the vehicle 800. The device 100 can be integrated into the vehicle 800 or coupled to the vehicle 800. In some implementations, the interior of the vehicle 800 generally corresponds to the first audio environment 124.

In a particular aspect, the device 100 is coupled to the display 720 and provides an output to the display 720 responsive to the communication between the user of the vehicle 800 and another user of another audio environment, such as indicating to the user the number and identity of other users in the communication.

In a particular implementation, the input component(s) 164 can include one or more microphones, as described in more detail above with reference to FIG. 1. In the same or alternative particular implementations, the output component(s) 166 can include one or more speakers, as described in more detail above with reference to FIG. 1.

Thus, the techniques described with respect to FIGS. 1-6 enable the device 100 of the vehicle 800 to augment audio for communication between or among a user of the vehicle 800 and other users in communication with the user of the vehicle 800.

Figure 9:
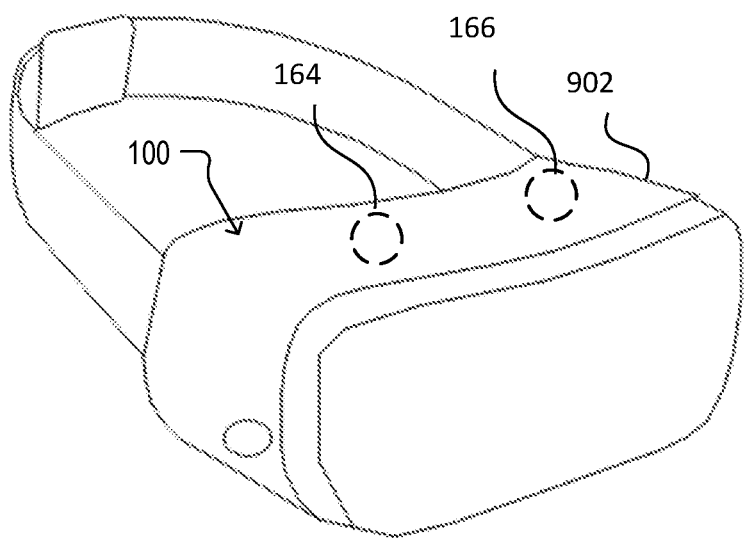
FIG. 9 illustrates a headset that incorporates aspects of the device of FIG. 1, in accordance with some examples of the present disclosure.

FIG. 9 illustrates a headset that incorporates aspects of the device of FIG. 1. FIG. 9 depicts an example of the device 100 coupled to or integrated within a headset 902, such as a virtual reality headset, an augmented reality headset, a mixed reality headset, an extended reality headset, a head-mounted display, or a combination thereof. A visual interface device is positioned in front of the user's eyes to enable display of augmented reality, mixed reality, or virtual reality images or scenes to the user while the headset 902 is worn. In some implementations, the headset 902 includes one or more input components 164, one or more output components 166, or some combination thereof. The one or more input components 164 and/or the one or more output components 166 are illustrated in dashed lines because they may or may not be visible to the user of the headset 902. The device 100 can be integrated into the headset 902 or coupled to the headset 902. In some implementations, the area in which a user of the headset 902 operates the headset 902 generally corresponds to the first audio environment 124.

In a particular implementation, the input component(s) 164 can include one or more microphones, as described in more detail above with reference to FIG. 1. In the same or alternative particular implementations, the output component(s) 166 can include one or more speakers, as described in more detail above with reference to FIG. 1. Thus, the techniques described with respect to FIGS. 1-6 enable the device 100 of the headset 902 to augment audio for communication between or among a user of the headset 902 and other users in communication with the user of the headset 902.

Figure 10:
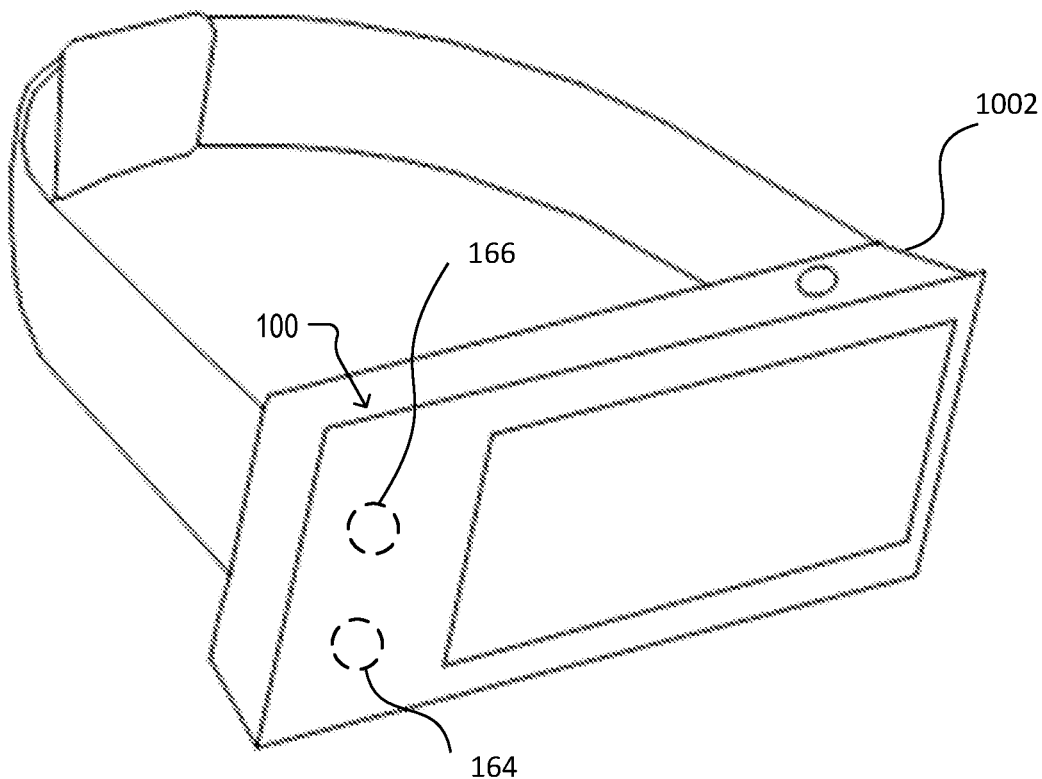
FIG. 10 illustrates a wearable electronic device that incorporates aspects of the device of FIG. 1, in accordance with some examples of the present disclosure.

FIG. 10 illustrates a wearable electronic device 1002 that incorporates aspects of the device 100 of FIG. 1. FIG. 10 illustrates the wearable electronic device 1002 as a "smart watch" that includes one or more input components 164, one or more output components 166, or some combination thereof. The one or more input components 164 and/or the one or more output components 166 are illustrated in dashed lines because they may or may not be visible to the user of the wearable electronic device 1002. The device 100 can be integrated into the wearable electronic device 1002 or coupled to the wearable electronic device 1002. In some implementations, the area in which a user of the wearable electronic device 1002 operates the wearable electronic device 1002 generally corresponds to the first audio environment 124.

In a particular implementation, the input component(s) 164 can include one or more microphones, as described in more detail above with reference to FIG. 1. In the same or alternative particular implementations, the output component(s) 166 can include one or more speakers, as described in more detail above with reference to FIG. 1. Thus, the techniques described with respect to FIGS. 1-6 enable the device 100 of the wearable electronic device 1002 to augment audio for communication between or among a user of the wearable electronic device 1002 and other users in communication with the user of the wearable electronic device 1002.

Figure 11:
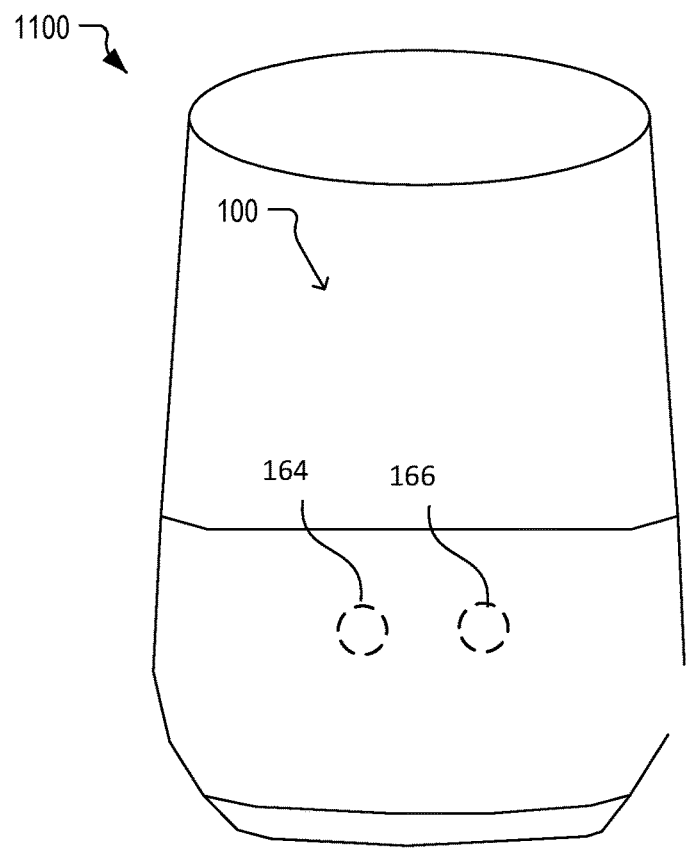
FIG. 11 illustrates a voice-controlled speaker system that incorporates aspects of the device of FIG. 1, in accordance with some examples of the present disclosure.

FIG. 11 is an illustrative example of a voice-controlled speaker system 1100 that incorporates aspects of the device of FIG. 1. The voice-controlled speaker system 1100 can have wireless network connectivity and is configured to execute an assistant operation. In FIG. 11, the device 100 is included in the voice-controlled speaker system 1100. The voice-controlled speaker system 1100 also includes one or more input components 164, one or more output components 166, or some combination thereof. The one or more input components 164 and/or the one or more output components 166 are illustrated in dashed lines because they may or may not be visible to the user of the voice-controlled speaker system 1100. The device 100 can be integrated into the voice-controlled speaker system 1100 or coupled to the voice-controlled speaker system 1100. In some implementations, the area in which a user of the voice-controlled speaker system 1100 operates the voice-controlled speaker system 1100 generally corresponds to the first audio environment 124.

In a particular implementation, the input component(s) 164 can include one or more microphones, as described in more detail above with reference to FIG. 1. In the same or alternative particular implementations, the output component(s) 166 can include one or more speakers, as described in more detail above with reference to FIG. 1. Thus, the techniques described with respect to FIGS. 1-6 enable the device 100 of the voice-controlled speaker system 1100 to augment audio for communication between or among a user of the voice-controlled speaker system 1100 and other users in communication with the user of the voice-controlled speaker system 1100.

Figure 12:
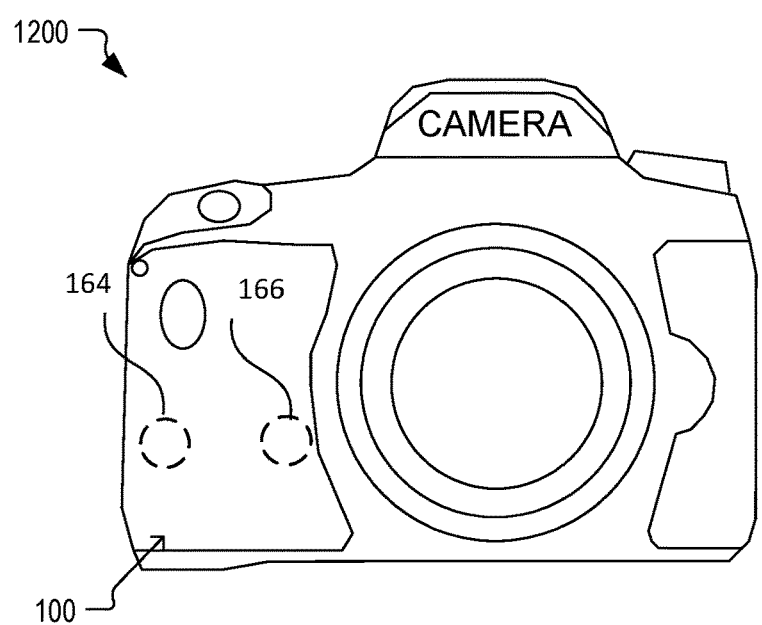
FIG. 12 illustrates a camera that incorporates aspects of the device of FIG. 1, in accordance with some examples of the present disclosure.

FIG. 12 illustrates a camera 1200 that incorporates aspects of the device 100 of FIG. 1. In FIG. 12, the device 100 is incorporated in or coupled to the camera 1200. The camera 1200 includes one or more input components 164, one or more output components 166, or some combination thereof. Additionally, the camera 1200 includes the device 100, which is configured to augment audio for communication between or among users. In a particular implementation, the camera 1200 is a video camera configured to augment audio in a virtual telecommunication session.

Figure 13:
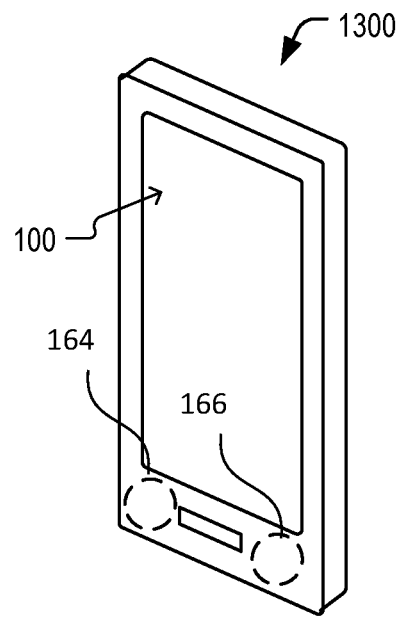
FIG. 13 illustrates a mobile device that incorporates aspects of the device of FIG. 1, in accordance with some examples of the present disclosure.

FIG. 13 illustrates a mobile device 1300 that incorporates aspects of the device 100 of FIG. 1. In FIG. 13, the device 100 is incorporated in or coupled to the mobile device 1300. The mobile device 1300 includes one or more input components 164, one or more output components 166, or some combination thereof. Additionally, the mobile device 1300 includes the device 100, which is configured to augment audio for communication between or among users. In a particular implementation, the mobile device 1300 includes software configured to operate a virtual telecommunication session.

Figure 14:
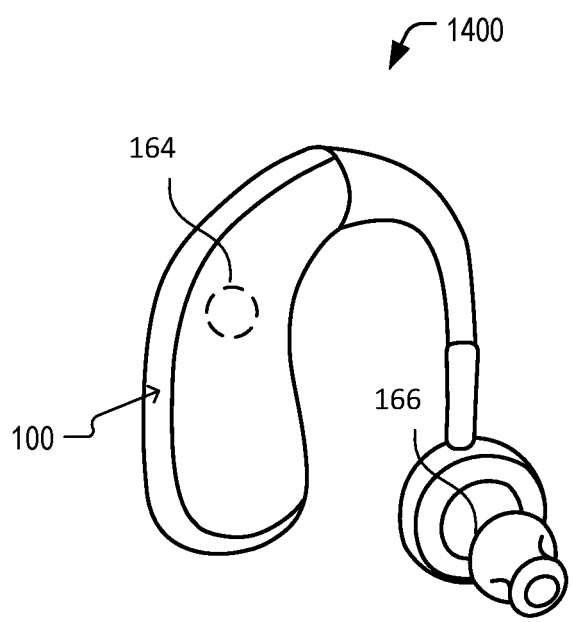
FIG. 14 illustrates a hearing aid device that incorporates aspects of the device of FIG. 1, in accordance with some examples of the present disclosure.

FIG. 14 illustrates a hearing aid device 1400 that incorporates aspects of the device 100 of FIG. 1. In FIG. 14, the hearing aid device 1400 includes or is coupled to the device 100 of FIG. 1. The hearing aid device 1400 includes one or more input components 164, one or more output components 166, or some combination thereof. During operation, the hearing aid device 1400 may process audio received from the input component(s) 164 for augmenting audio for the user of the hearing aid device 1400.

Figure 15:
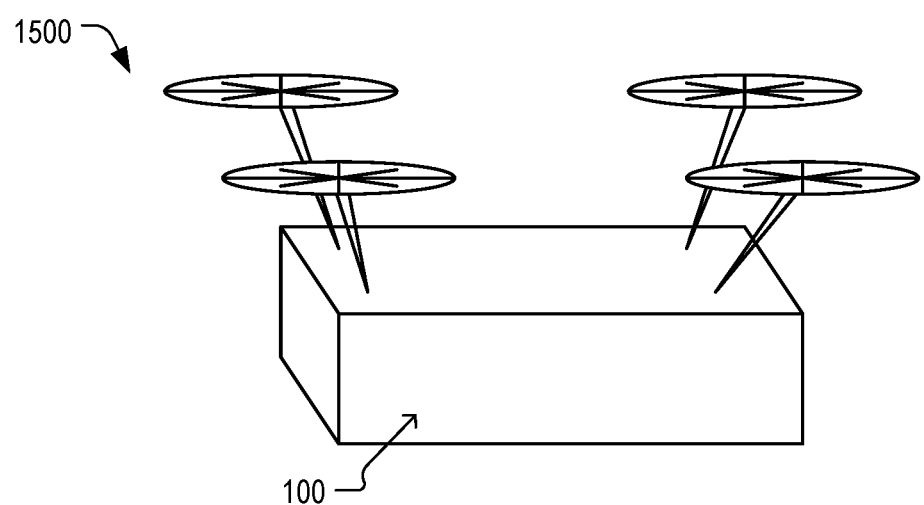
FIG. 15 illustrates an aerial device that incorporates aspects of the device of FIG. 1, in accordance with some examples of the present disclosure.

FIG. 15 illustrates an aerial device 1500 that incorporates aspects of the device 100 of FIG. 1. In FIG. 15, the aerial device 1500 includes or is coupled to the device 100 of FIG. 1. The aerial device 1500 is a manned, unmanned, or remotely piloted aerial device (e.g., a package delivery drone). During operation, the aerial device 1500 may be configured to provide a mobile, centralized computing platform for processing audio received from a plurality of audio environments in order to augment audio for communication between or among users of the plurality of audio environments.

Figure 16:
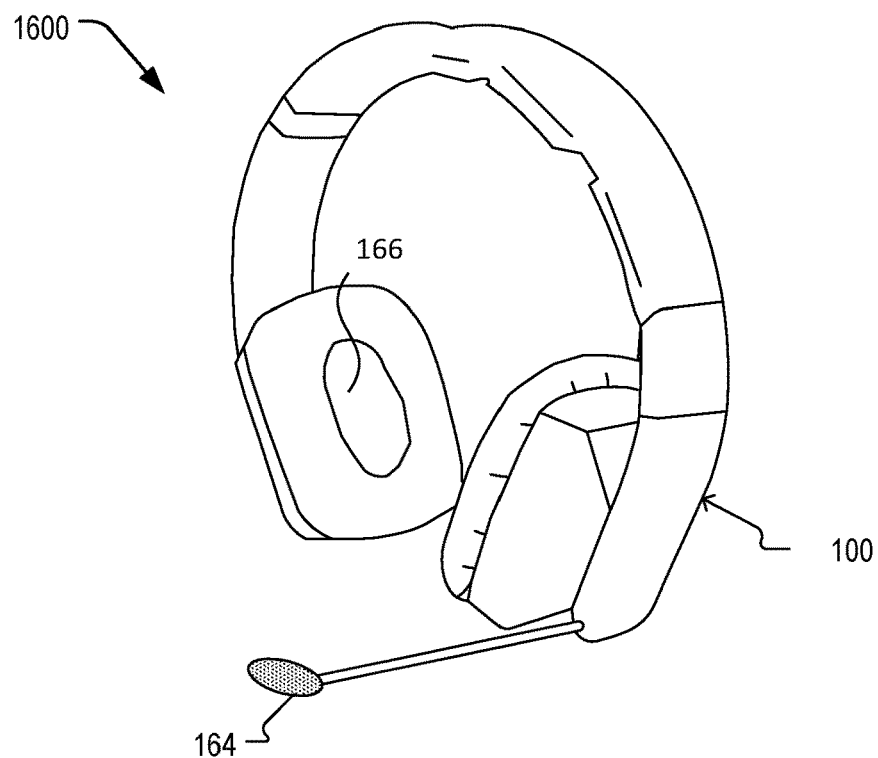
FIG. 16 illustrates a headset that incorporates aspects of the device of FIG. 1, in accordance with some examples of the present disclosure.

FIG. 16 illustrates a headset 1600 that incorporates aspects of the device 100 of FIG. 1. In FIG. 16, the headset 1600 includes or is coupled to the device 100 of FIG. 1. The headset 1600 includes one or more of the input component(s) 164 of FIG. 1 positioned to primarily capture speech of a user. The headset 1600 may also include one or more additional microphone positioned to primarily capture environmental sounds (e.g., for noise canceling operations) and one or more of the output components 166 of FIG. 1. In a particular aspect, the headset 1600 may process audio incoming from the user of the headset 1600 for augmenting communication between or among the user of the headset 1600 and other users in other audio environments.

Figure 17:
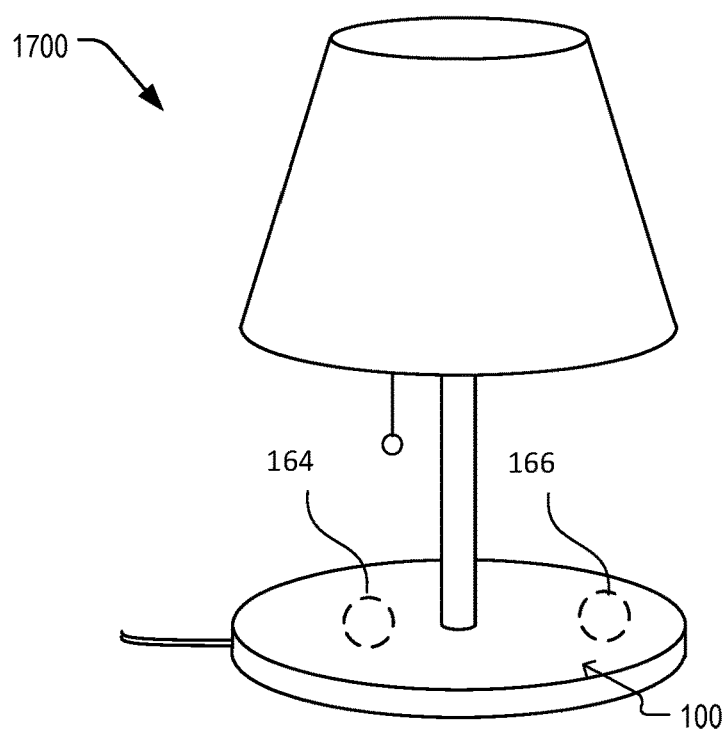
FIG. 17 illustrates an appliance that incorporates aspects of the device of FIG. 1, in accordance with some examples of the present disclosure.

FIG. 17 illustrates an appliance 1700 that incorporates aspects of the device 100 of FIG. 1. In FIG. 17, the appliance 1700 is a lamp; however, in other implementations, the appliance 1700 includes another Internet-of-Things appliance, such as a refrigerator, a coffee maker, an oven, another household appliance, etc. The appliance 1700 includes or is coupled to the device 100 of FIG. 1. The appliance 1700 includes the one or more input components 164, one or more output components 166, or some combination thereof. In a particular aspect, the appliance 1700 may process audio received via the one or more input components for augmenting audio in a communication between or among a user in the vicinity of the appliance 1700 and other users in the communication.

Figure 18:
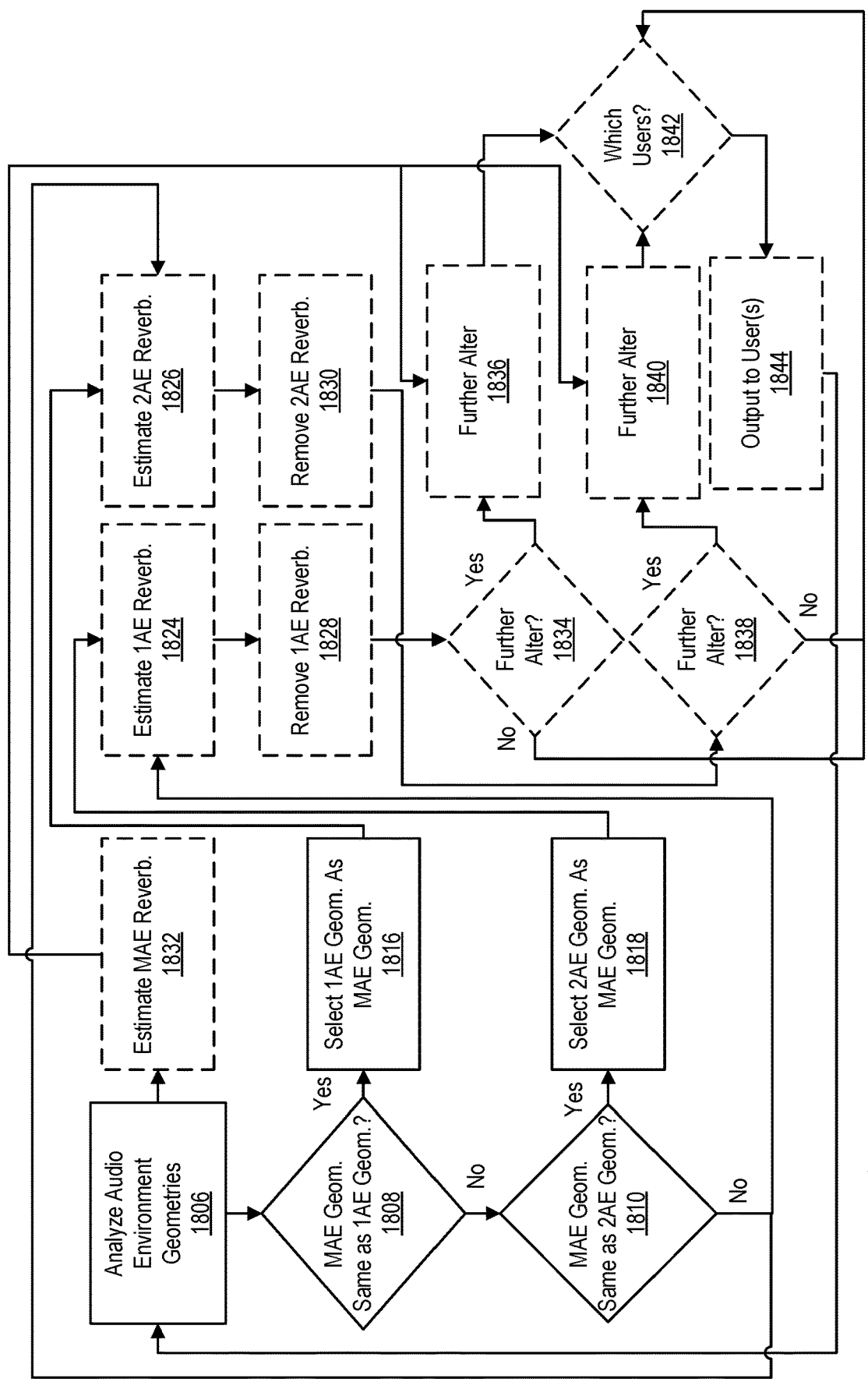
FIG. 18 is a flow chart of another example of a method for augmenting audio for communications, in accordance with some examples of the present disclosure.

FIG. 18 is a flow chart of another example of a method 1800 for augmenting audio for communications. The method 1800 may be initiated, performed, or controlled by one or more processors executing instructions, such as by the processor(s) 102 of FIG. 1 executing instructions from the memory 104.

In the example of FIG. 18, the method 1800 includes, at 1806, analyzing audio environment geometries. In some implementations, analyzing the audio environment geometries can include determining a virtual, mutual audio environment. For example, as described in more detail above with reference to FIGS. 1-6, the processor(s) 102 of FIG. 1 can analyze the first and second audio environment descriptions 114 and 1118 from the first and second audio environments 124 and 126, respectively, to determine a geometry associated with each of the first and second audio environments 124 and 126. The processor(s) 102 can be further configured to select a mutual audio environment geometry 118 that can be used to augment audio for communication in one or more of the first and second audio environments 124 and 126.

In the example of FIG. 18, the method 1800 also includes, at 1808, determining whether the mutual audio environment geometry is the same as or substantially similar (e.g., based on one or more thresholds) to the geometry of the first audio environment ("1AE"). For example, the processor(s) 102 of FIG. 1 can determine whether the mutual audio environment geometry 118 is the same as or substantially similar to the geometry of the first audio environment 124. In the example of FIG. 18, if the mutual audio environment is the same as or substantially similar to the geometry of the first audio environment, the method 1800 can proceed to, at 1816, select the first audio environment geometry as the mutual audio environment geometry.

In the example of FIG. 18, if the first audio environment geometry is not the same as or substantially similar to the mutual audio environment geometry, the method 1800 can also include, at 1810, determining whether the mutual audio environment geometry is the same as or substantially similar to the geometry of the second audio environment ("2AE"). For example, the processor(s) 102 of FIG. 1 can determine whether the mutual audio environment geometry 118 is the same as or substantially similar to (e.g., based on one or more thresholds) the geometry of the second audio environment 126. In the example of FIG. 18, if the mutual audio environment is the same as or substantially similar to the geometry of the second audio environment, the method 1800 can proceed to, at 1818, select the second audio environment geometry as the mutual audio environment geometry.

In certain configurations, the method 1800 can optionally include further processing, as illustrated by the dashed lines of FIG. 18. For example, in the example of FIG. 18, the method 1800 also can optionally include, at 1832, estimating one or more acoustical properties associated with the mutual audio environment ("MAE"). In some implementations, the acoustical properties can include reverberation associated with a particular sound source within the mutual audio environment. For example, the processor(s) 102 of FIG. 1 can analyze one or more sounds sources generating audio data (e.g., first audio data 128 and/or second audio data 130) and determine what reverberation characteristics the audio data would have within the mutual audio environment. In some configurations, the processor(s) 102 can be configured to estimate the reverberation by calculating a room impulse response associated with the audio data within the mutual audio environment using an image source model.

In the example of FIG. 18, the method 1800 can also optionally include, at 1824, estimating certain acoustical properties associated with one or more sound sources within the first audio environment. For example, the processor(s) 102 of FIG. 1 can estimate a reverberation associated with the first audio data 128 from the first audio environment 124. In some configurations, the processor(s) 102 can be configured to estimate the reverberation by calculating a room impulse response associated with the audio data within the mutual audio environment using an image source model.

In the example of FIG. 18, the method 1800 can also optionally include, at 1828, processing audio data from the first audio environment to modify one or more acoustical properties of the audio data. For example, the processor(s) 102 of FIG. 1 can be configured to process the first audio data 128 to remove any reverberation associated with the first audio data 128 within the first audio environment 124. In some configurations, this can include using the estimated reverberation associated with the first audio environment 124 described above with reference to 1824.

In the example of FIG. 18, the method 1800 can also optionally include, at 1834, determining whether to further alter incoming audio data prior to communicating the processed audio data to another audio environment. For example, the processor(s) 102 of FIG. 1 can be configured to determine whether to convolve one or more audio-altering signals with the processed audio data. In some configurations, the processor(s) 102 can be configured to determine whether to convolve the processed first audio data described above with reference to 1828 with a reverberation signal associated with the mutual audio environment (described above with reference to 1832). As described in more detail above with reference to FIG. 1, the device 100 can be configured to communicate the processed first audio data 170, which can, in some implementations, include the simulated reverberation 108 associated with the mutual audio environment. In the same or alternative implementations, the processed first audio data 170 may not include the simulated reverberation 108, which can be communicated separately.

In the example of FIG. 18, if the method 1800 determines to further alter incoming audio data, the method 1800 can also optionally include, at 1836, further altering the incoming audio data prior to communicating the processed audio data to another audio environment. For example, the processor(s) 102 of FIG. 1 can be configured to convolve one or more audio-altering signals (e.g., the reverberation associated with the mutual audio environment) with the processed audio data. As an additional example, the processor(s) 102 of FIG. 1 can be configured to reduce reverberation associated with one or more of the audio environments.

In the example of FIG. 18, the method 1800 can also optionally include, at 1842, determining which users in which audio environments should receive the processed audio data. For example, the processor(s) 102 of FIG. 1 can determine whether the user 132 of the first audio environment 124 and/or the user 134 of the second audio environment 126 should receive the processed first audio data 170. In some implementations, the processor(s) 102 can be configured to determine which users in which audio environment should receive the processed audio data before or after the processed audio data has been further altered to include new acoustical properties (as described above with reference to 1834 and 1836).

In the example of FIG. 18, the method 1800 can also optionally include, at 1826, estimating certain acoustical properties associated with one or more sound sources within the second audio environment. For example, the processor(s) 102 of FIG. 1 can estimate a reverberation associated with the second audio data 130 from the second audio environment 126. In some configurations, the processor(s) 102 can be configured to estimate the reverberation by calculating a room impulse response associated with the audio data within the mutual audio environment using an image source model.

In the example of FIG. 18, the method 1800 can also optionally include, at 1830, processing audio data from the first audio environment to modify one or more acoustical properties of the audio data. For example, the processor(s) 102 of FIG. 1 can be configured to process the second audio data 130 to remove any reverberation associated with the second audio data 130 within the second audio environment 126. In some configurations, this can include using the estimated reverberation associated with the second audio environment 126 described above with reference to 1826.

In the example of FIG. 18, the method 1800 can also optionally include, at 1838, determining whether to further alter incoming audio data prior to communicating the processed audio data to another audio environment. For example, the processor(s) 102 of FIG. 1 can be configured to determine whether to convolve one or more audio-altering signals with the processed audio data. In some configurations, the processor(s) 102 can be configured to determine whether to convolve the processed second audio data described above with reference to 1830 with a reverberation signal associated with the mutual audio environment (described above with reference to 1832). As described in more detail above with reference to FIG. 1, the device 100 can be configured to communicate the processed second audio data 1188, which can, in some implementations, include the simulated reverberation 108 associated with the mutual audio environment. In the same or alternative implementations, the processed second audio data 1188 may not include the simulated reverberation 108, which can be communicated separately.

In the example of FIG. 18, if the method 1800 determines to further alter incoming audio data, the method 1800 can also optionally include, at 1840, further altering the incoming audio data prior to communicating the processed audio data to another audio environment. For example, the processor(s) 102 of FIG. 1 can be configured to convolve one or more audio-altering signals (e.g., the reverberation associated with the mutual audio environment) with the processed audio data. As an additional example, the processor(s) 102 of FIG. 1 can be configured to reduce reverberation associated with one or more of the audio environments.

In the example of FIG. 18, the method 1800 can also optionally include, at 1842, determining which users in which audio environments should receive the processed audio data. For example, the processor(s) 102 of FIG. 1 can determine whether the user 132 of the first audio environment 124 and/or the user 134 of the second audio environment 126 should receive the processed first audio data 170. In some implementations, the processor(s) 102 can be configured to determine which users in which audio environment should receive the processed audio data before or after the processed audio data has been further altered to include new acoustical properties (as described above with reference to 1838 and 1840).

In the example of FIG. 18, the method 1800 can also optionally include, at 1844, outputting the processed audio data to one or more users. For example, the processor(s) 102 of FIG. 1 can be configured to communicate the processed first audio data 170 to the first audio environment 124 and/or the second audio environment 126. In some configurations, the processor(s) 102 can be configured to communicate the processed first audio data 170 to the one or more output components 160 and/or output component(s) 166 (e.g., one or more speakers).

Although the method 1800 is illustrated as including a certain number of operations, more, fewer, and/or different operations can be included in the method 1800 without departing from the scope of the present disclosure. For example, the method 1800 can exclude the determination of whether to further alter the processed audio data, as described above with reference to 1834 and 1838. As an additional example, the method 1800 can vary depending on the number of audio environments participating in a particular communication. As a further example, the method 1800 can communicate all processed audio data to all users.

Further, although the examples provided above in illustrating method 1800 describe the processor(s) 102 of FIG. 1 performing the operations of the method 1800, some or all of operations of the method 1800 can be performed by any suitable computing device. For example, as described above with reference to 1834 and 1838, the method 1800 can include determining whether to further modify the processed audio data prior to communicating the processed audio data to one or more users. In some configurations, the device 100 can send the simulated reverberation 108 separately from the processed audio data and a computing device within the individual audio environment can further process the communicated audio data (e.g., by convolving the processed audio data with the simulated reverberation). As an additional example, the determination of the mutual audio environment geometry (e.g., as described above with reference to 1806) can be performed by one or more servers in communication with the processor(s) 102 of FIG. 1. As a further example, the determination of whether to output a particular processed audio signal to a user within a particular audio environment (e.g., as described above with reference to 1842) can be performed by an output device within the individual audio environment.

In some implementations, the operations described with reference to FIGS. 5-6 and/or 18 are performed at the device 100 of FIG. 1 (e.g., at the one or more processors 102). The device 100 may include, correspond to, or be included within a voice activated device, an audio device, a wireless speaker and voice activated device, a portable electronic device, a car, a vehicle, a computing device, a communication device, an internet-of-things (IoT) device, a virtual reality (VR) device, an augmented reality (AR) device, a mixed reality (MR) device, a hearing aid device, a smart speaker, a mobile computing device, a mobile communication device, a smart phone, a cellular phone, a laptop computer, a computer, a tablet, a personal digital assistant, a display device, a television, a gaming console, an appliance, a music player, a radio, a digital video player, a digital video disc (DVD) player, a tuner, a camera, a navigation device, or any combination thereof. In a particular aspect, the one or more processors 102, the memory 104, or a combination thereof, are included in an integrated circuit. Various implementations that include aspects of the device 100 are described further with reference to FIGS. 7-17.

Devices (e.g., those previously mentioned) may have both Bluetooth and Wi-Fi capabilities, or other wireless means to communicate with each other. Inter-networked devices may have wireless means to communicate with each other and may also be connected based on different cellular communication systems, such as, a Long Term Evolution (LTE) system, a Code Division Multiple Access (CDMA) system, a Global System for Mobile Communications (GSM) system, a wireless local area network (WLAN) system, or some other wireless system. A CDMA system may implement Wideband CDMA (WCDMA), CDMA 1×, Evolution-Data Optimized (EVDO), Time Division Synchronous CDMA (TD-SCDMA), or some other version of CDMA. As used herein, "wireless" refers to one or more of the above-listed technologies, one or more other technologies that enable transfer of information other than via wires, or a combination thereof.

As used herein, "downloading" and "uploading" a model includes transferring of data (e.g., compressed data) corresponding to the model over a wired link, over a wireless link, or a combination thereof. For example, wireless local area networks ("WLANs") may be used in place of, or in addition to, wired networks. Wireless technologies, such as Bluetooth® ("Bluetooth") and Wireless Fidelity "Wi-Fi" or variants of Wi-Fi (e.g. Wi-Fi Direct), enable high speed communications between mobile electronic devices (e.g., cellular phones, watches, headphones, remote controls, etc.) that are within relatively short distances of one another (e.g., 100 to 200 meters or less depending on the specific wireless technology). Wi-Fi is often used to connect and exchange information between a device with an access point, (e.g. a router) and devices that are Wi-Fi enabled. Examples of such devices are smart televisions, laptops, thermostats, personal assistant devices, home automation devices, wireless speakers and other similar devices. Similarly, Bluetooth is also used to couple devices together. Example of such are mobile phones, computers, digital cameras, wireless headsets, keyboards, mice or other input peripherals, and similar devices.

In conjunction with the described implementations, an apparatus includes means for determining, based on data descriptive of two or more audio environments, a geometry of a mutual audio environment. For example, the means for determining the geometry of the mutual audio environment includes the device 100, the processor(s) 102, the mutual audio environment selector 110, the wireless device 200, the wireless device 224, the wireless device 302, the AP 304, one or more other circuits or components configured to determine, based on data descriptive of two or more audio environments, a geometry of a mutual audio environment, or any combination thereof.

The apparatus also includes means for processing audio data, based on the geometry of the mutual audio environment, for output at an audio device disposed in a first audio environment of the two or more audio environments. For example, the means for processing the audio data includes the device 100, the processor(s) 102, the audio processor(s) 112, the wireless device 200, the wireless device 224, the wireless device 302, the AP 304, one or more other circuits or components configured to process audio data, based on the geometry of the mutual audio environment, for output at an audio device disposed in a first audio environment of the two or more audio environments, or any combination thereof.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, such implementation decisions are not to be interpreted as causing a departure from the scope of the present disclosure.

The steps of a method or algorithm described in connection with the implementations disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

Particular aspects of the disclosure are described below in a first set of interrelated clauses:

Clause 1 includes a device including: a memory storing instructions; and one or more processors coupled to the memory and configured to execute the instructions to: determine, based on data descriptive of two or more audio environments, a geometry of a mutual audio environment; and process audio data, based on the geometry of the mutual audio environment, for output at an audio device disposed in a first audio environment of the two or more audio environments.

Clause 2 includes the device of Clause 1, wherein the one or more processors are further configured to execute the instructions to obtain the audio data from a second audio device that is disposed in a second audio environment of the two or more audio environments.

Clause 3 includes the device of any of Clauses 1-2, wherein the audio data represents audio of a call between two or more users, and the first audio environment includes a room in which at least one of the two or more users is located.

Clause 4 includes the device of any of Clauses 1-3, wherein the mutual audio environment corresponds to one of the two or more audio environments.

Clause 5 includes the device of any of Clauses 1-4, wherein the mutual audio environment corresponds to a volume representing an intersection of the two or more audio environments.

Clause 6 includes the device of any of Clauses 1-4, wherein the mutual audio environment corresponds to a virtual space distinct from each of the two or more audio environments.

Clause 7 includes the device of any of Clauses 1-4, wherein the mutual audio environment corresponds to a virtual room having reverberation characteristics based on the geometry of the mutual audio environment.

Clause 8 includes the device of any of Clauses 1-7, wherein processing the audio data includes filtering the audio data to reduce reverberation associated with a second audio environment of the two or more audio environments.

Clause 9 includes the device of any of Clauses 1-8, wherein processing the audio data includes combining the audio data with simulated reverberation associated with the mutual audio environment.

Clause 10 includes the device of any of Clauses 1-9, wherein processing the audio data includes suppressing background noise associated with a second audio environment of the two or more audio environments.

Clause 11 includes the device of any of Clauses 1-10, wherein processing the audio data includes adding, to the audio data, directionality information associated with a sound source.

Clause 12 includes the device of any of Clauses 1-10, wherein processing the audio data includes removing, from the audio data, directionality information associated with a sound source.

Clause 13 includes the device of any of Clauses 1-10, wherein processing the audio data includes modifying a portion of the audio data that indicates directionality information associated with a sound source.

Clause 14 includes the device of any of Clauses 1-13, wherein the one or more processors are further configured to execute the instructions to obtain motion data indicating movement of a user within a second audio environment of the two or more audio environments, wherein the audio data is modified based on the motion data.

Clause 15 includes the device of Clause 14, wherein the motion data is based on a change in a gaze direction of the user.

Clause 16 includes the device of any of Clauses 1-15, wherein the one or more processors are further configured to execute the instructions to modify the mutual audio environment based on motion data associated with at least one of the two or more audio environments.

Clause 17 includes the device of Clause 16, wherein modifying the mutual audio environment includes shifting boundaries of the mutual audio environment relative to one or more sound sources of the mutual audio environment.

Clause 18 includes the device of Clause 16, wherein modifying the mutual audio environment includes changing a shape of the geometry of the mutual audio environment.

Clause 19 includes the device of Clause 16, wherein modifying the mutual audio environment includes changing a size of the mutual audio environment.

Clause 20 includes the device of any of Clauses 1-19, wherein processing the audio data includes removing one or more audio components from the audio data.

Clause 21 includes the device of any of Clauses 1-19, wherein processing the audio data includes adding one or more audio components to the audio data.

Clause 22 includes the device of any of Clauses 1-19, wherein processing the audio data includes modifying one or more audio components of the audio data.

Clause 23 includes the device of any of Clauses 1-19, wherein processing the audio data includes enhancing, in the audio data, one or more audio components associated with a particular sound source.

Clause 24 includes the device of any of Clauses 1-23, wherein processing the audio data includes changing a frequency range associated with one or more audio components of the audio data.

Clause 25 includes the device of any of Clauses 1-24, wherein the one or more processors are further configured to execute the instructions to determine an orientation of a user relative to a sound source in the mutual audio environment, wherein the audio data is processed based on the orientation.

Clause 26 includes the device of Clause 25, wherein the one or more processors are further configured to execute the instructions to obtain motion data associated with at least one of the two or more audio environments and to modify the mutual audio environment, based on the motion data, to maintain the orientation.

Clause 27 includes the device of Clause 25, wherein the one or more processors are further configured to execute the instructions to obtain motion data associated with at least one of the two or more audio environments and to modify the orientation based on the motion data.

Clause 28 includes the device of any of Clauses 1-27, wherein the data descriptive of the two or more audio environments includes geometry data for each of the two or more audio environments.

Clause 29 includes the device of Clause 28, wherein the geometry data associated with a particular audio environment of the two or more audio environments is determined based on wireless range measurement of the particular audio environment.

Clause 30 includes the device of any of Clauses 1-29, wherein the data descriptive of the two or more audio environments includes reverberation characteristics data for each of the two or more audio environments.

Clause 31 includes the device of any of Clauses 1-30, wherein the data descriptive of the two or more audio environments includes, for a particular audio environment of the two or more audio environments, an indication of a location within the particular audio environment of a sound source.

Clause 32 includes the device of any of Clauses 1-31, wherein the data descriptive of the two or more audio environments includes, for a particular audio environment of the two or more audio environments, an indication of a location within the particular audio environment of a user.

Clause 33 includes the device of any of Clauses 1-32, wherein audio data is processed further based on a location, within the mutual audio environment of a virtual reality object, an augmented reality object, a mixed reality object, or an extended reality object.

Clause 34 includes the device of any of Clauses 1-33, wherein determining the geometry of the mutual audio environment includes determining a mutual coordinate system based on the data descriptive of the two or more audio environments and the instructions are further configured to cause the one or more processors to associate a first position in the mutual coordinate system with a first sound source of the first audio environment and to associate a second position in the mutual coordinate system with a second sound source of a second audio environment of the two or more audio environments.

Clause 35 includes the device of any of Clauses 1-34, wherein determining the geometry of the mutual audio environment includes determining a mutual coordinate system based on the data descriptive of the two or more audio environments and the instructions are further configured to map a gaze direction of a user in a particular audio environment of the two or more audio environments to the mutual coordinate system, and to generate, based on the gaze direction, a visual rendering of the mutual audio environment.

Clause 36 includes a method including: determining, based on data descriptive of two or more audio environments, a geometry of a mutual audio environment; and processing audio data, based on the geometry of the mutual audio environment, for output at an audio device disposed in a first audio environment of the two or more audio environments.

Clause 37 includes the method of Clause 36, further including obtaining the audio data from a second audio device that is disposed in a second audio environment of the two or more audio environments.

Clause 38 includes the method of any of Clauses 36-37, wherein the audio data represents audio of a call between two or more users, and the first audio environment includes a room in which at least one of the two or more users is located.

Clause 39 includes the method of any of Clauses 36-38, wherein the mutual audio environment corresponds to one of the two or more audio environments.

Clause 40 includes the method of any of Clauses 36-39, wherein the mutual audio environment corresponds to a volume representing an intersection of the two or more audio environments.

Clause 41 includes the method of any of Clauses 36-39, wherein the mutual audio environment corresponds to a virtual space distinct from each of the two or more audio environments.

Clause 42 includes the method of any of Clauses 36-39, wherein the mutual audio environment corresponds to a virtual room having reverberation characteristics based on the geometry of the mutual audio environment.

Clause 43 includes the method of any of Clauses 36-42, wherein processing the audio data includes filtering the audio data to reduce reverberation associated with a second audio environment of the two or more audio environments.

Clause 44 includes the method of any of Clauses 36-43, wherein processing the audio data includes combining the audio data with simulated reverberation associated with the mutual audio environment.

Clause 45 includes the method of any of Clauses 36-44, wherein processing the audio data includes suppressing background noise associated with a second audio environment of the two or more audio environments.

Clause 46 includes the method of any of Clauses 36-45, wherein processing the audio data includes adding, to the audio data, directionality information associated with a sound source.

Clause 47 includes the method of any of Clauses 36-45, wherein processing the audio data includes removing, from the audio data, directionality information associated with a sound source.

Clause 48 includes the method of any of Clauses 36-45, wherein processing the audio data includes modifying a portion of the audio data that indicates directionality information associated with a sound source.

Clause 49 includes the method of any of Clauses 36-48, further including obtaining motion data indicating movement of a user within a second audio environment of the two or more audio environments, wherein the audio data is modified based on the motion data.

Clause 50 includes the method of Clause 49, wherein the motion data is based on a change in a gaze direction of the user.

Clause 51 includes the method of any of Clauses 36-50, further including modifying the mutual audio environment based on motion data associated with at least one of the two or more audio environments.

Clause 52 includes the method of Clause 51, wherein modifying the mutual audio environment includes shifting boundaries of the mutual audio environment relative to one or more sound sources of the mutual audio environment.

Clause 53 includes the method of Clause 51, wherein modifying the mutual audio environment includes changing a shape of the geometry of the mutual audio environment.

Clause 54 includes the method of Clause 51, wherein modifying the mutual audio environment includes changing a size of the mutual audio environment.

Clause 55 includes the method of any of Clauses 36-54, wherein processing the audio data includes removing one or more audio components from the audio data.

Clause 56 includes the method of any of Clauses 36-54, wherein processing the audio data includes adding one or more audio components to the audio data.

Clause 57 includes the method of any of Clauses 36-54, wherein processing the audio data includes modifying one or more audio components of the audio data.

Clause 58 includes the method of any of Clauses 36-54, wherein processing the audio data includes enhancing, in the audio data, one or more audio components associated with a particular sound source.

Clause 59 includes the method of any of Clauses 36-58, wherein processing the audio data includes changing a frequency range associated with one or more audio components of the audio data.

Clause 60 includes the method of any of Clauses 36-59, further including determining an orientation of a user relative to a sound source in the mutual audio environment, wherein the audio data is processed based on the orientation.

Clause 61 includes the method of Clause 61, further including obtaining motion data associated with at least one of the two or more audio environments and modifying the mutual audio environment, based on the motion data, to maintain the orientation.

Clause 62 includes the method of Clause 61, further including obtaining motion data associated with at least one of the two or more audio environments and modifying the orientation based on the motion data.

Clause 63 includes the method of any of Clauses 36-62, wherein the data descriptive of the two or more audio environments includes geometry data for each of the two or more audio environments.

Clause 64 includes the method of Clause 63, wherein the geometry data associated with a particular audio environment of the two or more audio environments is determined based on wireless range measurement of the particular audio environment.

Clause 65 includes the method of any of Clauses 36-64, wherein the data descriptive of the two or more audio environments includes reverberation characteristics data for each of the two or more audio environments.

Clause 66 includes the method of any of Clauses 36-65, wherein the data descriptive of the two or more audio environments includes, for a particular audio environment of the two or more audio environments, an indication of a location within the particular audio environment of a sound source.

Clause 67 includes the method of any of Clauses 36-66, wherein the data descriptive of the two or more audio environments includes, for a particular audio environment of the two or more audio environments, an indication of a location within the particular audio environment of a user.

Clause 68 includes the method of any of Clauses 36-67, wherein audio data is processed further based on a location, within the mutual audio environment of a virtual reality object, an augmented reality object, a mixed reality object, or an extended reality object.

Clause 69 includes the method of any of Clauses 36-68, wherein determining the geometry of the mutual audio environment includes determining a mutual coordinate system based on the data descriptive of the two or more audio environments and the method further includes associating a first position in the mutual coordinate system with a first sound source of the first audio environment and associating a second position in the mutual coordinate system with a second sound source of a second audio environment of the two or more audio environments.

Clause 70 includes the method of any of Clauses 36-69, wherein determining the geometry of the mutual audio environment includes determining a mutual coordinate system based on the data descriptive of the two or more audio environments and the method further includes mapping a gaze direction of a user in a particular audio environment of the two or more audio environments to the mutual coordinate system, and generating, based on the gaze direction, a visual rendering of the mutual audio environment.

Clause 71 includes a non-transient, computer-readable medium storing instructions that, when executed by a processor, cause the processor to: determine, based on data descriptive of two or more audio environments, a geometry of a mutual audio environment; and process audio data, based on the geometry of the mutual audio environment, for output at an audio device disposed in a first audio environment of the two or more audio environments.

Clause 72 includes the non-transient, computer-readable medium of Clause 71, wherein the instructions, when executed by the processor, further cause the processor to obtain the audio data from a second audio device that is disposed in a second audio environment of the two or more audio environments.

Clause 73 includes the non-transient, computer-readable medium of any of Clauses 71-72, wherein the audio data represents audio of a call between two or more users, and the first audio environment includes a room in which at least one of the two or more users is located.

Clause 74 includes the non-transient, computer-readable medium of any of Clauses 71-73, wherein the mutual audio environment corresponds to one of the two or more audio environments.

Clause 75 includes the non-transient, computer-readable medium of any of Clauses 71-74, wherein the mutual audio environment corresponds to a volume representing an intersection of the two or more audio environments.

Clause 76 includes the non-transient, computer-readable medium of any of Clauses 71-74, wherein the mutual audio environment corresponds to a virtual space distinct from each of the two or more audio environments.

Clause 77 includes the non-transient, computer-readable medium of any of Clauses 71-74, wherein the mutual audio environment corresponds to a virtual room having reverberation characteristics based on the geometry of the mutual audio environment.

Clause 78 includes the non-transient, computer-readable medium of any of Clauses 71-77, wherein processing the audio data includes filtering the audio data to reduce reverberation associated with a second audio environment of the two or more audio environments.

Clause 79 includes the non-transient, computer-readable medium of any of Clauses 71-78, wherein processing the audio data includes combining the audio data with simulated reverberation associated with the mutual audio environment.

Clause 80 includes the non-transient, computer-readable medium of any of Clauses 71-79, wherein processing the audio data includes suppressing background noise associated with a second audio environment of the two or more audio environments.

Clause 81 includes the non-transient, computer-readable medium of any of Clauses 71-80, wherein processing the audio data includes adding, to the audio data, directionality information associated with a sound source.

Clause 82 includes the non-transient, computer-readable medium of any of Clauses 71-80, wherein processing the audio data includes removing, from the audio data, directionality information associated with a sound source.

Clause 83 includes the non-transient, computer-readable medium of any of Clauses 71-80, wherein processing the audio data includes modifying a portion of the audio data that indicates directionality information associated with a sound source.

Clause 84 includes the non-transient, computer-readable medium of any of Clauses 71-83, wherein the instructions, when executed by the processor, further cause the processor to obtain motion data indicating movement of a user within a second audio environment of the two or more audio environments, wherein the audio data is modified based on the motion data.

Clause 85 includes the non-transient, computer-readable medium of Clause 84, wherein the motion data is based on a change in a gaze direction of the user.

Clause 86 includes the non-transient, computer-readable medium of any of Clauses 71-85, wherein the instructions, when executed by the processor, further cause the processor to modify the mutual audio environment based on motion data associated with at least one of the two or more audio environments.

Clause 87 includes the non-transient, computer-readable medium of Clause 86, wherein modifying the mutual audio environment includes shifting boundaries of the mutual audio environment relative to one or more sound sources of the mutual audio environment.

Clause 88 includes the non-transient, computer-readable medium of Clause 86, wherein modifying the mutual audio environment includes changing a shape of the geometry of the mutual audio environment.

Clause 89 includes the non-transient, computer-readable medium of Clause 86, wherein modifying the mutual audio environment includes changing a size of the mutual audio environment.

Clause 90 includes the non-transient, computer-readable medium of any of Clauses 71-89, wherein processing the audio data includes removing one or more audio components from the audio data.

Clause 91 includes the non-transient, computer-readable medium of any of Clauses 71-89, wherein processing the audio data includes adding one or more audio components to the audio data.

Clause 92 includes the non-transient, computer-readable medium of any of Clauses 71-89, wherein processing the audio data includes modifying one or more audio components of the audio data.

Clause 93 includes the non-transient, computer-readable medium of any of Clauses 71-89, wherein processing the audio data includes enhancing, in the audio data, one or more audio components associated with a particular sound source.

Clause 94 includes the non-transient, computer-readable medium of any of Clauses 71-93, wherein processing the audio data includes changing a frequency range associated with one or more audio components of the audio data.

Clause 95 includes the non-transient, computer-readable medium of any of Clauses 71-94, wherein the instructions, when executed by the processor, further cause the processor to determine an orientation of a user relative to a sound source in the mutual audio environment, wherein the audio data is processed based on the orientation.

Clause 96 includes the non-transient, computer-readable medium of Clause 95, wherein the instructions, when executed by the processor, further cause the processor to obtain motion data associated with at least one of the two or more audio environments and modifying the mutual audio environment, based on the motion data, to maintain the orientation.

Clause 97 includes the non-transient, computer-readable medium of Clause 95, wherein the instructions, when executed by the processor, further cause the processor to obtain motion data associated with at least one of the two or more audio environments and modifying the orientation based on the motion data.

Clause 98 includes the non-transient, computer-readable medium of any of Clauses 71-97, wherein the data descriptive of the two or more audio environments includes geometry data for each of the two or more audio environments.

Clause 99 includes the non-transient, computer-readable medium of Clause 98, wherein the geometry data associated with a particular audio environment of the two or more audio environments is determined based on wireless range measurement of the particular audio environment.

Clause 100 includes the non-transient, computer-readable medium of any of Clauses 71-99, wherein the data descriptive of the two or more audio environments includes reverberation characteristics data for each of the two or more audio environments.

Clause 101 includes the non-transient, computer-readable medium of any of Clauses 71-100, wherein the data descriptive of the two or more audio environments includes, for a particular audio environment of the two or more audio environments, an indication of a location within the particular audio environment of a sound source.

Clause 102 includes the non-transient, computer-readable medium of any of Clauses 71-101, wherein the data descriptive of the two or more audio environments includes, for a particular audio environment of the two or more audio environments, an indication of a location within the particular audio environment of a user.

Clause 103 includes the non-transient, computer-readable medium of any of Clauses 71-102, wherein audio data is processed further based on a location, within the mutual audio environment of a virtual reality object, an augmented reality object, a mixed reality object, or an extended reality object.

Clause 104 includes the non-transient, computer-readable medium of any of Clauses 71-103, wherein determining the geometry of the mutual audio environment includes determining a mutual coordinate system based on the data descriptive of the two or more audio environments and the non-transient, computer-readable medium further includes associating a first position in the mutual coordinate system with a first sound source of the first audio environment and associating a second position in the mutual coordinate system with a second sound source of a second audio environment of the two or more audio environments.

Clause 105 includes the non-transient, computer-readable medium of any of Clauses 71-104, wherein determining the geometry of the mutual audio environment includes determining a mutual coordinate system based on the data descriptive of the two or more audio environments and the non-transient, computer-readable medium further includes mapping a gaze direction of a user in a particular audio environment of the two or more audio environments to the mutual coordinate system, and generating, based on the gaze direction, a visual rendering of the mutual audio environment.

Clause 105 includes a device including: means for determining, based on data descriptive of two or more audio environments, a geometry of a mutual audio environment; and means for processing audio data, based on the geometry of the mutual audio environment, for output at an audio device disposed in a first audio environment of the two or more audio environments.

Clause 106 includes the device of Clause 105, further including means for obtaining the audio data from a second audio device that is disposed in a second audio environment of the two or more audio environments.

Clause 107 includes the device of any of Clauses 105-106, wherein the audio data represents audio of a call between two or more users, and the first audio environment includes a room in which at least one of the two or more users is located.

Clause 108 includes the device of any of Clauses 105-107, wherein the mutual audio environment corresponds to one of the two or more audio environments.

Clause 109 includes the device of any of Clauses 105-108, wherein the mutual audio environment corresponds to a volume representing an intersection of the two or more audio environments.

Clause 110 includes the device of any of Clauses 105-108, wherein the mutual audio environment corresponds to a virtual space distinct from each of the two or more audio environments.

Clause 111 includes the device of any of Clauses 105-108, wherein the mutual audio environment corresponds to a virtual room having reverberation characteristics based on the geometry of the mutual audio environment.

Clause 112 includes the device of any of Clauses 105-111, wherein processing the audio data includes filtering the audio data to reduce reverberation associated with a second audio environment of the two or more audio environments.

Clause 113 includes the device of any of Clauses 105-112, wherein processing the audio data includes combining the audio data with simulated reverberation associated with the mutual audio environment.

Clause 114 includes the device of any of Clauses 105-113, wherein processing the audio data includes suppressing background noise associated with a second audio environment of the two or more audio environments.

Clause 115 includes the device of any of Clauses 105-114, wherein processing the audio data includes adding, to the audio data, directionality information associated with a sound source.

Clause 116 includes the device of any of Clauses 105-114, wherein processing the audio data includes removing, from the audio data, directionality information associated with a sound source.

Clause 117 includes the device of any of Clauses 105-114, wherein processing the audio data includes modifying a portion of the audio data that indicates directionality information associated with a sound source.

Clause 118 includes the device of any of Clauses 105-117, further including means for obtaining motion data indicating movement of a user within a second audio environment of the two or more audio environments, wherein the audio data is modified based on the motion data.

Clause 119 includes the device of Clause 118, wherein the motion data is based on a change in a gaze direction of the user.

Clause 120 includes the device of any of Clauses 105-119, further including means for modifying the mutual audio environment based on motion data associated with at least one of the two or more audio environments.

Clause 121 includes the device of Clause 120, wherein modifying the mutual audio environment includes shifting boundaries of the mutual audio environment relative to one or more sound sources of the mutual audio environment.

Clause 122 includes the device of Clause 120, wherein modifying the mutual audio environment includes changing a shape of the geometry of the mutual audio environment.

Clause 123 includes the device of Clause 120, wherein modifying the mutual audio environment includes changing a size of the mutual audio environment.

Clause 124 includes the device of any of Clauses 105-123, wherein processing the audio data includes removing one or more audio components from the audio data.

Clause 125 includes the device of any of Clauses 105-123, wherein processing the audio data includes adding one or more audio components to the audio data.

Clause 126 includes the device of any of Clauses 105-123, wherein processing the audio data includes modifying one or more audio components of the audio data.

Clause 127 includes the device of any of Clauses 105-123, wherein processing the audio data includes enhancing, in the audio data, one or more audio components associated with a particular sound source.

Clause 128 includes the device of any of Clauses 105-127, wherein processing the audio data includes changing a frequency range associated with one or more audio components of the audio data.

Clause 129 includes the device of any of Clauses 105-128, further including means for determining an orientation of a user relative to a sound source in the mutual audio environment, wherein the audio data is processed based on the orientation.

Clause 130 includes the device of Clause 129, further including means for obtaining motion data associated with at least one of the two or more audio environments and means for modifying the mutual audio environment, based on the motion data, to maintain the orientation.

Clause 131 includes the device of Clause 130, further including means for obtaining motion data associated with at least one of the two or more audio environments and means for modifying the orientation based on the motion data.

Clause 132 includes the device of any of Clauses 105-131, wherein the data descriptive of the two or more audio environments includes geometry data for each of the two or more audio environments.

Clause 133 includes the device of Clause 132, wherein the geometry data associated with a particular audio environment of the two or more audio environments is determined based on wireless range measurement of the particular audio environment.

Clause 134 includes the device of any of Clauses 105-133, wherein the data descriptive of the two or more audio environments includes reverberation characteristics data for each of the two or more audio environments.

Clause 135 includes the device of any of Clauses 105-134, wherein the data descriptive of the two or more audio environments includes, for a particular audio environment of the two or more audio environments, an indication of a location within the particular audio environment of a sound source.

Clause 136 includes the device of any of Clauses 105-135, wherein the data descriptive of the two or more audio environments includes, for a particular audio environment of the two or more audio environments, an indication of a location within the particular audio environment of a user.

Clause 137 includes the device of any of Clauses 105-136, wherein audio data is processed further based on a location, within the mutual audio environment of a virtual reality object, an augmented reality object, a mixed reality object, or an extended reality object.

Clause 138 includes the device of any of Clauses 105-137, wherein determining the geometry of the mutual audio environment includes determining a mutual coordinate system based on the data descriptive of the two or more audio environments and the device further includes means for associating a first position in the mutual coordinate system with a first sound source of the first audio environment and associating a second position in the mutual coordinate system with a second sound source of a second audio environment of the two or more audio environments.

Clause 139 includes the device of any of Clauses 105-139, wherein determining the geometry of the mutual audio environment includes determining a mutual coordinate system based on the data descriptive of the two or more audio environments and the device further includes means for mapping a gaze direction of a user in a particular audio environment of the two or more audio environments to the mutual coordinate system, and generating, based on the gaze direction, a visual rendering of the mutual audio environment.

Clause 140 includes the device of any of Clauses 1-35, further including a modem coupled to the one or more processors and configured to send the processed audio data to the audio device.

What is claimed is:

1. A device comprising:
a memory configured to store data descriptive of two or more audio environments; and
one or more processors coupled to the memory and configured to execute the instructions to:
determine, based on the data descriptive of two or more audio environments, a geometry of a mutual audio environment and a mutual coordinate system;
map a gaze direction of a user in a particular audio environment of the two or more audio environments to the mutual coordinate system;

generate, based on the gaze direction, a visual rendering of the mutual audio environment; and process audio data, based on the geometry of the mutual audio environment, for output at an audio device disposed in a first audio environment of the two or more audio environments.

2. The device of claim 1, wherein the one or more processors are further configured to obtain the audio data from a second audio device that is disposed in a second audio environment of the two or more audio environments.

3. The device of claim 1, wherein the audio data represents audio of a call between two or more users, and the first audio environment includes a room in which at least one of the two or more users is located.

4. The device of claim 1, wherein the mutual audio environment corresponds to one of the two or more audio environments, a volume representing an intersection of the two or more audio environments, a virtual space distinct from each of the two or more audio environments, or a virtual room having reverberation characteristics based on the geometry of the mutual audio environment.

5. The device of claim 1, wherein the one or more processors are configured to process the audio data comprises application of a filter to the audio data to reduce reverberation associated with a second audio environment of the two or more audio environments.

6. The device of claim 1, wherein the one or more processors are configured to process the audio data comprises:

a combination of the audio data with simulated reverberation associated with the mutual audio environment;

suppression of background noise associated with a second audio environment of the two or more audio environments;

addition, to the audio data, directionality information associated with a sound source;

removal, from the audio data, directionality information associated with the sound source; and modification of a portion of the audio data that indicates directionality information associated with the sound source.

7. The device of claim 1, wherein the one or more processors are further configured to obtain motion data indicating movement of a user within a second audio environment of the two or more audio environments, wherein the audio data is modified based on the motion data.

8. The device of claim 7, wherein the motion data is based on a change in a gaze direction of the user.

9. The device of claim 7, wherein the one or more processors are configured to obtain motion data via a bistatic radio frequency ("RF") sensing operation.

10. The device of claim 7, wherein the one or more processors are configured to obtain motion data via a monostatic radio frequency ("RF") sensing operation.

11. The device of claim 1, wherein the one or more processors are further configured to modify the mutual audio environment based on motion data associated with at least one of the two or more audio environments.

12. The device of claim 11, wherein to modify the mutual audio environment includes one or more shifts of boundaries of the mutual audio environment relative to one or more sound sources of the mutual audio environment, to change a shape of the geometry of the mutual audio environment, or to change a size of the mutual audio environment.

13. The device of claim 1, wherein the one or more processors are configured to process the audio data comprises:

removal of one or more audio components from the audio data;

addition of one or more audio components to the audio data; and modification of one or more audio components of the audio data.

14. The device of claim 1, wherein the one or more processors are configured to process the audio data comprises, in the audio data, enhancement of one or more audio components associated with a particular sound source.

15. The device of claim 1, wherein the one or more processors are configured to process the audio data comprises a change of frequency range associated with one or more audio components of the audio data.

16. The device of claim 1, wherein the one or more processors are further configured to process the audio data based on determination of an orientation of a user relative to a sound source in the mutual audio environment.

17. The device of claim 16, wherein the one or more processors are further configured to obtain motion data associated with at least one of the two or more audio environments and to modify the mutual audio environment, based on the motion data, to maintain the orientation.

18. The device of claim 16, wherein the one or more processors are further configured to obtain motion data associated with at least one of the two or more audio environments and to modify the orientation based on the motion data.

19. The device of claim 1, wherein the data descriptive of the two or more audio environments includes geometry data for each of the two or more audio environments.

20. The device of claim 19, wherein the geometry data associated with a particular audio environment of the two or more audio environments is determined based on wireless range measurement of the particular audio environment.

21. The device of claim 1, wherein the data descriptive of the two or more audio environments includes reverberation characteristics data for each of the two or more audio environments.

22. The device of claim 1, wherein the data descriptive of the two or more audio environments includes, for a particular audio environment of the two or more audio environments, an indication of a location within the particular audio environment of a sound source.

23. The device of claim 1, further comprising a modem coupled to the one or more processors and configured to send the processed audio data to the audio device.

24. The device of claim 1, wherein audio data is processed further based on a location, within the mutual audio environment of a virtual reality object, an augmented reality object, a mixed reality object, or an extended reality object.

25. The device of claim 1, wherein the one or more processors are configured to:

determine the geometry of the mutual audio environment comprises a mutual coordinate system based on the data descriptive of the two or more audio environments;

associate a first position in the mutual coordinate system with a first sound source of the first audio environment; and associate a second position in the mutual coordinate system with a second sound source of a second audio environment of the two or more audio environments.

26. A method comprising:
   determining, based on data descriptive of two or more audio environments, a geometry of a mutual audio environment and a mutual coordinate system;
   mapping a gaze direction of a user in a particular audio environment of the two or more audio environments to the mutual coordinate system;
   generating, based on the gaze direction, a visual rendering of the mutual audio environment; and
   processing audio data, based on the geometry of the mutual audio environment, for output at an audio device disposed in a first audio environment of the two or more audio environments.

27. The method of claim 26, further comprising obtaining motion data indicating movement of a user within a second audio environment of the two or more audio environments, wherein the audio data is modified based on the motion data.

28. A non-transient, computer-readable medium storing instructions that, when executed by a processor, cause the processor to:
   determine, based on data descriptive of two or more audio environments, a geometry of a a mutual audio environment and a mutual coordinate system;
   map a gaze direction of a user in a particular audio environment of the two or more audio environments to the mutual coordinate system;
   generate, based on the gaze direction, a visual rendering of the mutual audio environment; and
   process audio data, based on the geometry of the mutual audio environment, for output at an audio device disposed in a first audio environment of the two or more audio environments.

29. A device comprising:
   means for determining, based on data descriptive of two or more audio environments, a geometry of a mutual audio environment and a mutual coordinate system;
   means for mapping a gaze direction of a user in a particular audio environment of the two or more audio environments to the mutual coordinate system;
   means for generating, based on the gaze direction, a visual rendering of the mutual audio environment; and
   means for processing audio data, based on the geometry of the mutual audio environment, for output at an audio device disposed in a first audio environment of the two or more audio environments.

* * * * *